United States Patent
Wagner et al.

(10) Patent No.: US 12,121,990 B2
(45) Date of Patent: Oct. 22, 2024

(54) LASER WELDING MACHINE AND WELD STATE MONITORING METHOD

(71) Applicant: AMADA CO., LTD., Kanagawa (JP)

(72) Inventors: Alexander Wagner, Kanagawa (JP); Mario Zschippang, Kanagawa (JP); Michael Lammert, Kanagawa (JP); Takaaki Yamanashi, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 713 days.

(21) Appl. No.: 17/296,424

(22) PCT Filed: Nov. 12, 2019

(86) PCT No.: PCT/JP2019/044226
§ 371 (c)(1),
(2) Date: May 24, 2021

(87) PCT Pub. No.: WO2020/110694
PCT Pub. Date: Jun. 4, 2020

(65) Prior Publication Data
US 2022/0009026 A1  Jan. 13, 2022

(30) Foreign Application Priority Data
Nov. 27, 2018 (DE) .................. 10 2018 220 329.6

(51) Int. Cl.
*B23K 26/03* (2006.01)
*B23K 26/24* (2014.01)
(Continued)

(52) U.S. Cl.
CPC ............ *B23K 26/032* (2013.01); *B23K 26/24* (2013.01); *B23K 31/125* (2013.01); *G06T 7/0004* (2013.01); *G06T 2207/30164* (2013.01)

(58) Field of Classification Search
CPC .... B23K 26/21; B23K 31/125; B23K 26/032; B23K 26/24; G06T 7/0004
See application file for complete search history.

(56) References Cited

U.S. PATENT DOCUMENTS

| 5,533,146 A | 7/1996 | Iwai |
| 5,748,045 A | 5/1998 | Tateishi |

(Continued)

FOREIGN PATENT DOCUMENTS

| JP | 5-71932 A | 3/1993 |
| JP | H09-22566 A | 1/1997 |

(Continued)

OTHER PUBLICATIONS

International Search Report for corresponding Application No. PCT/JP2019/044226, mailed Feb. 4, 2020.
(Continued)

*Primary Examiner* — Thien S Tran
(74) *Attorney, Agent, or Firm* — Renner, Otto, Boisselle & Sklar, LLP

(57) ABSTRACT

A camera captures a predetermined range including a beam spot of a laser beam irradiated on the first and second sheet metals to be welded. An image analysis device determines whether a welding defect has occurred, based on an image signal obtained by capturing the first and second sheet metals. The image analysis device sets an analysis window in a frame of the image signal, and a center of the beam spot is located at a reference point set in the analysis window. A region extractor extracts pixels of a region of interest whose position is set with reference to the reference point corresponding to a welding defect of a determination target, among pixels included in the analysis window. A welding defect determination unit determines whether the welding
(Continued)

defect of the determination target has occurred, based on luminance in the region of interest.

7 Claims, 16 Drawing Sheets

(51) Int. Cl.
*B23K 31/12* (2006.01)
*G06T 7/00* (2017.01)

(56) References Cited

U.S. PATENT DOCUMENTS

2002/0144984 A1 10/2002 Mori
2012/0152916 A1* 6/2012 Oowaki ................ B23K 26/03
219/121.64

FOREIGN PATENT DOCUMENTS

| JP | 11-10373 A | 1/1999 |
| JP | 2002-321073 A | 11/2002 |
| JP | 2005-14027 A | 1/2005 |
| WO | 2011/024904 A1 | 3/2011 |

OTHER PUBLICATIONS

Written Opinion for corresponding Application No. PCT/JP2019/044226, mailed Feb. 4, 2020.

* cited by examiner (a)

(b)

LASER WELDING MACHINE AND WELD STATE MONITORING METHOD

TECHNICAL FIELD

The present disclosure relates to a laser welding machine and a weld state monitoring method.

BACKGROUND ART

Laser welding machines can weld two sheet metals butted against each other by irradiating a laser beam to the boundary therebetween. Unless various conditions for welding the two sheet metals are set optimally, welding defects may occur in which the two sheet metals are not properly welded.

CITATION LIST

Patent Literature

[Patent Literature 1]: Japanese Unexamined Patent Application Publication No. 2002-321073
[Patent Literature 2]: Japanese Unexamined Patent Application Publication No. 9-22566

SUMMARY OF INVENTION

Technical Problem

It is required to determine in real time whether or not a welding defect has occurred during the welding of sheet metals. There are a plurality of types of welding defects, and it is required to determine which welding defect among a plurality of types of welding defects has occurred.

In order to respond to such a demand, an object of one or more embodiments is to provide a laser welding machine and a weld state monitoring method capable of determining in real time whether or not a welding defect has occurred during the welding of sheet metals, and determining which welding defect among a plurality of types of welding defects has occurred.

Solution to Problem

A first aspect of one or more embodiments provides a laser welding machine including: a camera configured to capture a predetermined range including a beam spot of a laser beam irradiated on the first and second sheet metals to be welded; and an image analysis device configured to determine whether or not a welding defect has occurred, based on an image signal obtained by capturing the first and second sheet metals by the camera, wherein the image analysis device sets an analysis window as a region for determining whether or not a welding defect has occurred in a frame of the image signal, and a center of the beam spot is located at a reference point set in the analysis window, and wherein the image analysis device includes: a region extractor configured to extract pixels of a region of interest whose position is set with reference to the reference point corresponding to a welding defect of a determination target, among pixels included in the analysis window; and a welding defect determination unit configured to determine whether or not the welding defect of the determination target has occurred, based on luminance in the region of interest extracted by the region extractor.

A second aspect of one or more embodiments provides a weld state monitoring method including: capturing a predetermined range including a beam spot of a laser beam irradiated on the first and second sheet metals to be welded by a camera; setting an analysis window as a region for determining whether or not a welding defect has occurred in a frame of the image signal obtained by capturing the first and second sheet metals by the camera; positioning a reference point set in the analysis window at a center of the beam spot; extracting pixels of a region of interest whose position is set with reference to the reference point corresponding to a welding defect of a determination target, among pixels included in the analysis window; and determining whether or not the welding defect of the determination target has occurred, based on luminance in the extracted region of interest during the welding of the first and second sheet metals.

Advantageous Effects of Invention

In accordance with the laser welding machine and the laser welding method according to one or more embodiments, it is possible to determine in real time whether or not a welding defect has occurred during the welding of sheet metals, and to determine which welding defect among a plurality of types of welding defects has occurred.

DESCRIPTION OF EMBODIMENTS

Figure 1:
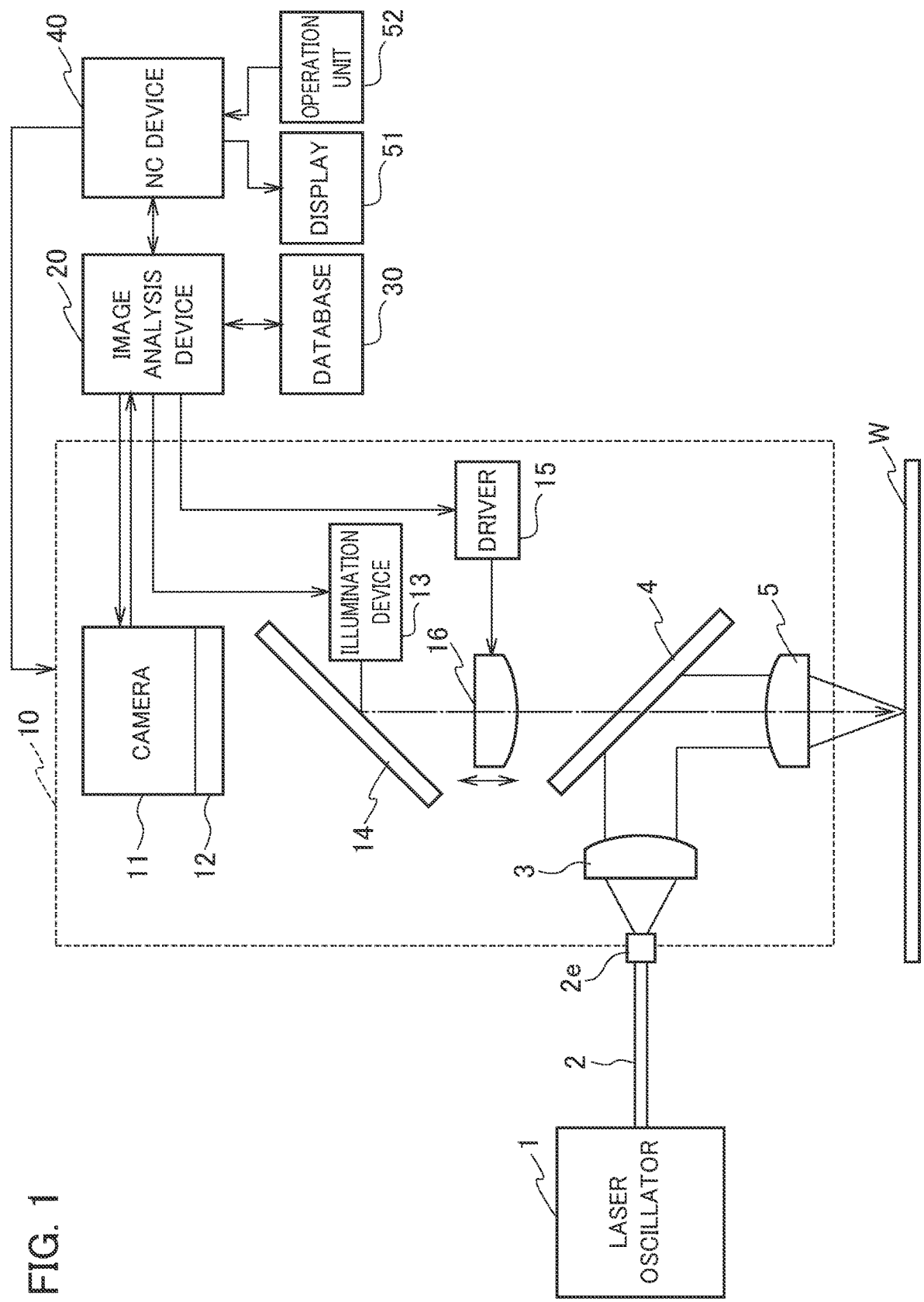
FIG. 1 is a diagram illustrating an overall configuration example of a laser welding machine according to one or more embodiments.

A laser welding machine and a weld state monitoring method according to one or more embodiments will be described below with reference to the accompanying drawings. In FIG. 1, a laser oscillator 1 oscillates and emits a laser beam. As an example, the laser oscillator 1 is a fiber laser oscillator that emits a laser beam having a wavelength of 1060 nm to 1080 nm. A delivery fiber 2 transmits the laser beam emitted from the laser oscillator 1 to the welding head 10. An end cap 2e is provided at the emission end of the laser beam of the delivery fiber 2, and the end cap 2e is connected to the welding head 10.

The laser beam which is divergent light emitted from the delivery fiber 2 is incident on the collimating lens 3. The collimating lens 3 converts divergent light into parallel light (collimated light). A bend mirror 4 bends the traveling direction of the laser beam by 90 degrees, and makes the laser beam enter a focusing lens 5. The bend mirror 4 is composed of a dichroic mirror. The focusing lens 5 focuses the incident laser beam, and irradiates the laser beam to the boundary between two sheet metals W as welding objects. The focusing lens 5 will be referred to as a laser focusing lens 5. In FIG. 1, the end face of the sheet metal W positioned on the near side of the two sheet metals W is shown.

The angle of a welding head 10 with respect to the sheet metal W is configured to be varied. The NC device 40 that controls the entire laser welding machine adjusts the angle of the welding head 10 with respect to the sheet metal W. In addition, the welding head 10 is attached to the tip of a welding robot, and the welding head 10 is configured to be movable by the NC device 40 controlling the movement of the welding robot. The laser welding machine may be a single-axis welding machine or a two-axis welding machine.

A camera 11 is disposed at the upper end portion inside the welding head 10. The camera 11 is a single focus camera. A band pass filter 12 that transmits light having a wavelength of 800 nm band is attached to the tip portion of the camera 11. When an illumination device 13 is controlled to be turned on, the illumination device 13 irradiates the bend mirror 14 with illumination light having a wavelength of 810 nm indicated by a one-dot chain line. The illumination device 13 can be constituted by a plurality of light-emitting diodes (LEDs). The bend mirror 14 is composed of a dichroic mirror.

The illumination light is reflected by the bend mirror 14, the traveling direction thereof is bent by 90 degrees, passes through a focusing lens 16, the bend mirror 4, and the laser focusing lens 5, and is irradiated onto the sheet metal W. The focusing lens 16 is provided for focusing when the camera 11 captures the sheet metal W, and the focusing lens 16 is referred to as an image focusing lens 16. The image focusing lens 16 is configured to be movable in the vertical direction.

The light generated by irradiating the boundary between the two sheet metals W with the laser beam is transmitted through the laser focusing lens 5, the bend mirror 4, the image focusing lens 16, and the bend mirror 14, and is incident on the camera 11. The camera 11 captures the two sheet metals W being welded. At this time, a driver 15 moves the image focusing lens 16 in a direction to approach the bend mirror 4 or in a direction to move away from the bend mirror 4, so that the focal point of the camera 11 is aligned with the surface of the sheet metals W. When the camera 11 captures the sheet metals W, there are cases where the illumination light is not irradiated and the illumination light is irradiated from the illumination device 13.

An image analysis device 20 for analyzing image signals obtained by capturing the sheet metals W by the camera 11, a display 51, and an operation unit 52 are connected to the NC device 40. The operator of the laser welding machine operates the operation unit 52 to set various kinds of conditions on the NC device 40, or to start or terminate welding of the sheet metals W. The display 51 and the operation unit 52 may be integrated.

The image analysis device 20 can be constituted by a computing device. The image analysis device 20 controls the camera 11, the illumination device 13, and the driver 15. The camera 11 supplies an image signal, obtained when the sheet metals W are captured, to the image analysis device 20. A database 30 is connected to the image analysis device 20. The database 30 stores various kinds of information used when the camera 11 captures the sheet metals W and when the image analysis device 20 analyzes the image signal.

In the laser welding machine shown in FIG. 1, the internal configuration of the welding head 10 is an example, and the internal configuration of the welding head 10 is not limited to the configuration shown in FIG. 1. The welding head 10 may be configured such that the camera 11 is a multifocal camera and the driver 15 adjusts the focus of the camera 11.

Welding defects will be described that may occur when one or more embodiments of the laser welding machine configured as described above weld two sheet metals W. FIGS. 2A to 2E are cross-sectional views conceptually showing a state in which the sheet metals W1 and W2 are abutted against each other at the end faces and welded. The welding shown in FIGS. 2A to 2E is called a butt welding. Note that a gap of a predetermined distance may be provided between the end faces of the sheet metals W1 and W2, or may be abutted without a gap. In this regard, even when the end faces of the sheet metals W1 and W2 are abutted without a gap, strictly there is a small gap between the two end faces.

Figure 2A:
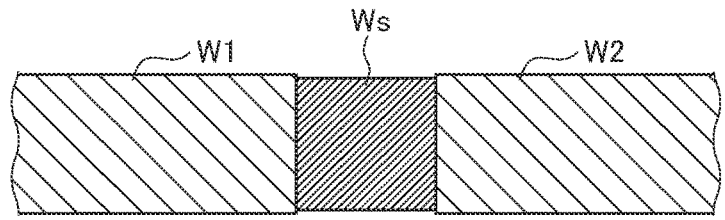
FIG. 2A is a cross-sectional view conceptually illustrating a good welding state in which no welding defect has occurred in a butt welding.
Figure 2B:
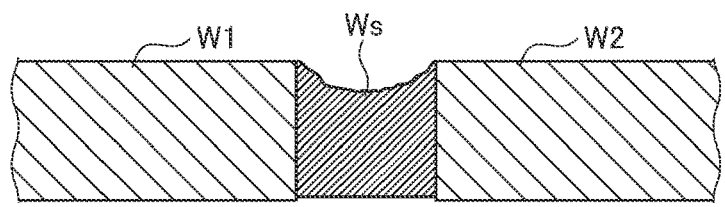
FIG. 2B is a cross-sectional view conceptually illustrating a state in which an underfill as a welding defect has occurred in a butt welding.
Figure 2C:
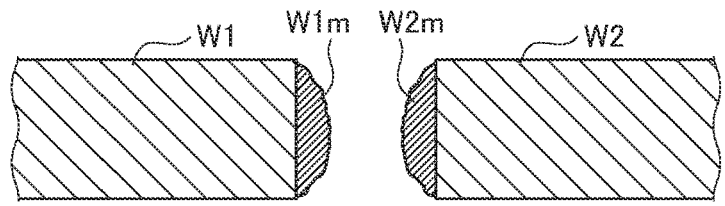
FIG. 2C is a cross-sectional view conceptually illustrating a state in which an unconnected welding defect has occurred in a butt welding.

FIG. 2A shows a good welding state in which no welding defect has occurred. Between both end faces of the sheet metals W1 and W2, a weld seam Ws is formed in which the metals of the sheet metals W1 and W2 are melted and solidified. FIG. 2B shows a state in which a welding defect called an underfill has occurred. In the underfill, the surface of the weld seam Ws is recessed. FIG. 2C shows a state in which an unconnected welding defect has occurred. Molten metals W1$m$ and W2$m$ solidified after the metals have melted adhere to both end faces of the sheet metals W1 and W2, however the molten metals W1m and W2$m$ are not connected and thereby the sheet metals W1 and W2 are not connected.

Figure 2D:
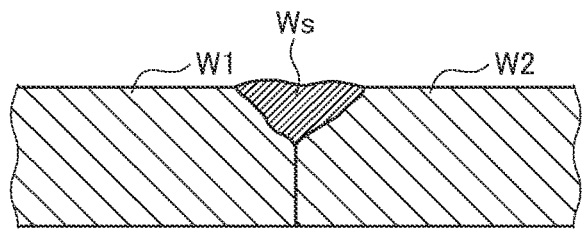
FIG. 2D is a cross-sectional view conceptually illustrating a state in which a welding defect of insufficient penetration has occurred in a butt welding.
Figure 2E:
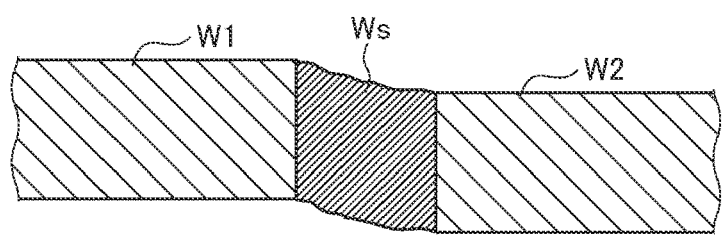
FIG. 2E is a cross-sectional view conceptually illustrating a state in which a welding defect of edge displacement has occurred in a butt welding.

FIG. 2D shows a state where a welding defect of insufficient penetration has occurred, in which the welding seam Ws is formed only partway in the depth direction from the surfaces of the sheet metals W1 and W2. FIG. 2E shows a state in which a welding defect of edge displacement has occurred, in which the end faces of the sheet metals W1 and W2 are not completely opposed to each other, and the sheet metals W1 and W2 are welded in a state where the end faces are displaced. The welding defect of edge displacement occurs when at least one end portion of the sheet metals W1 and W2 is deformed by heat, and both end surfaces are displaced in a direction orthogonal to the sheet metal plane.

FIGS. 3A to 3D are cross-sectional views conceptually showing a state in which the end portion of the sheet metal W1 are placed on the end surface of the sheet metal W2, and both end surfaces are welded. FIGS. 3A to 3D show a semi-hanging corner joint in which the end face of the sheet metal W1 is positioned at the intermediate position of the end face of the sheet metal W2. In FIGS. 3A to 3D, the arrow line indicates the direction in which the welding head 10 faces (that is, the direction facing the camera 11).

Figure 3A:
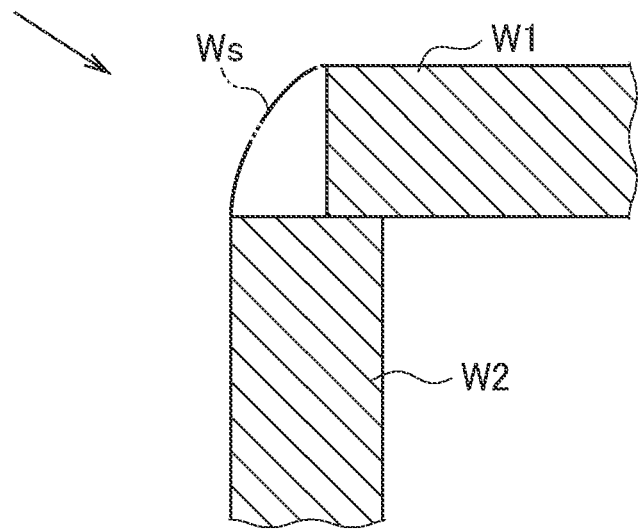
FIG. 3A is a cross-sectional view conceptually illustrating a good welding state in which no welding defect has occurred in a welding of a corner joint.
Figure 3B:
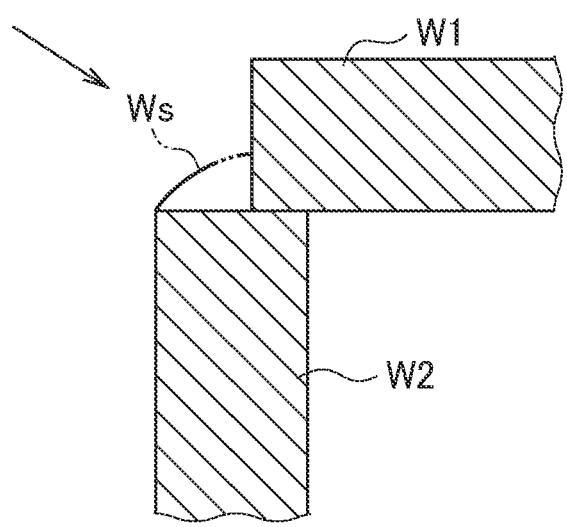
FIG. 3B is a cross-sectional view conceptually illustrating a state in which a welding defect of a narrow welding seam has occurred in a welding of a corner joint.

FIG. 3A shows a good welding state in which no welding defect has occurred. As indicated by the two-dot chain line, the metal of the sheet metals W1 and W2 melts and solidifies between both end faces of the sheet metals W1 and W2 to form a convex welding seam Ws covering the entire corner. FIG. 3B shows a state in which a welding defect of a narrow welding seam has occurred, in which the width of the welding bead is narrow and the welding seam Ws does not cover the entire corner.

Figure 3C:
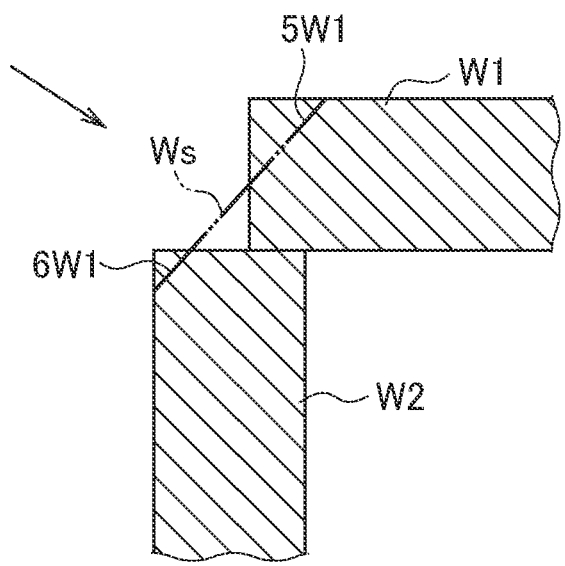
FIG. 3C is a cross-sectional view conceptually illustrating a state in which a welding defect of a flat welding seam has occurred in a welding of a corner joint.
Figure 3D:
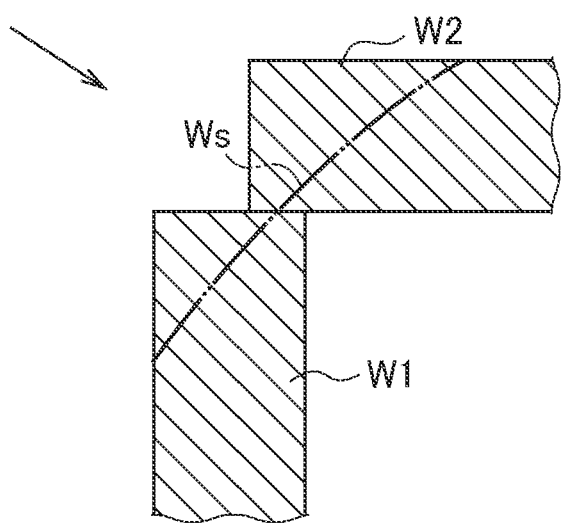
FIG. 3D is a cross-sectional view conceptually illustrating a state in which a welding defect of excessive melting has occurred in a welding of a corner joint.

FIG. 3C shows a state in which a welding defect of a flat welding seam has occurred, in which the weld seam Ws between both end faces of the sheet metals W1 and W2 does not have a convex shape so as to cover the entire corner. FIG. 3D shows a state in which a welding defect of excessive melting has occurred, in which both end portions of sheet metals W1 and W2 are excessively melted.

The welding machine and the weld state monitoring method according to one or more embodiments determines in real time whether a welding defect has occurred during the welding of the sheet metals W1 and W2, and determines that which one of the welding defects has occurred among the welding defects shown in FIGS. 2B to 2E and 3B to 3D.

The welding machine and the weld state monitoring method according to one or more embodiments determines that the sheet metals W1 and W2 are adequately welded as shown in FIG. 2A, unless the welding defects shown in FIGS. 2B to 2D has occurred during the butt welding of the sheet metals W1 and W2. The welding machine and the weld state monitoring method according to one or more embodiments determines that the sheet metals W1 and W2 are adequately welded as shown in FIG. 3A, unless the welding defects shown in FIGS. 3B to 3D occur during the welding of a corner joint of the sheet metals W1 and W2.

Next, a specific description will be given of how the image analyzing device 20 determines whether or not a welding defect has occurred, based on the image signal obtained by capturing the sheet metals W1 and W2 by the camera 11.

Figure 4:
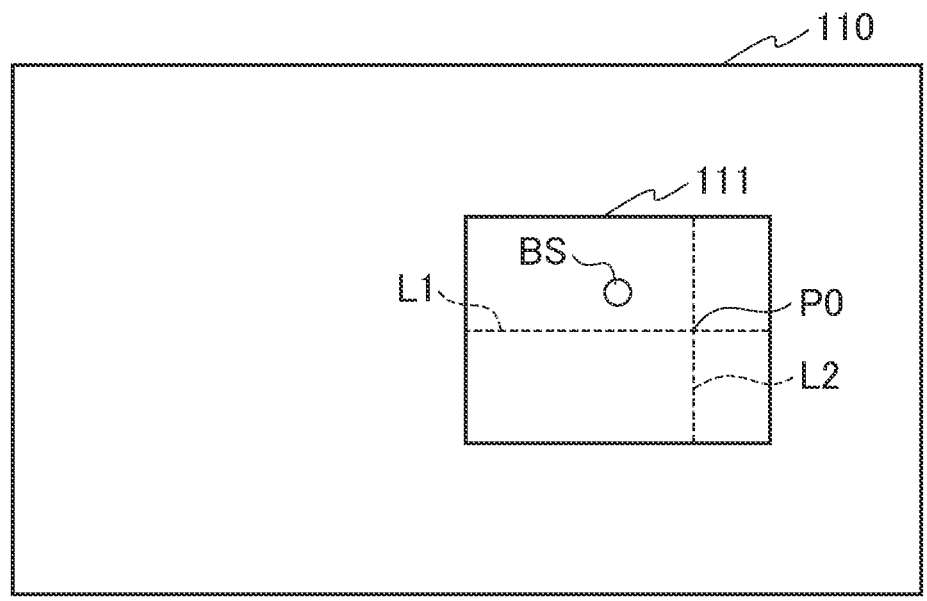
FIG. 4 illustrates a calibration of an analysis window set in a frame of an image signal.
Figure 4:
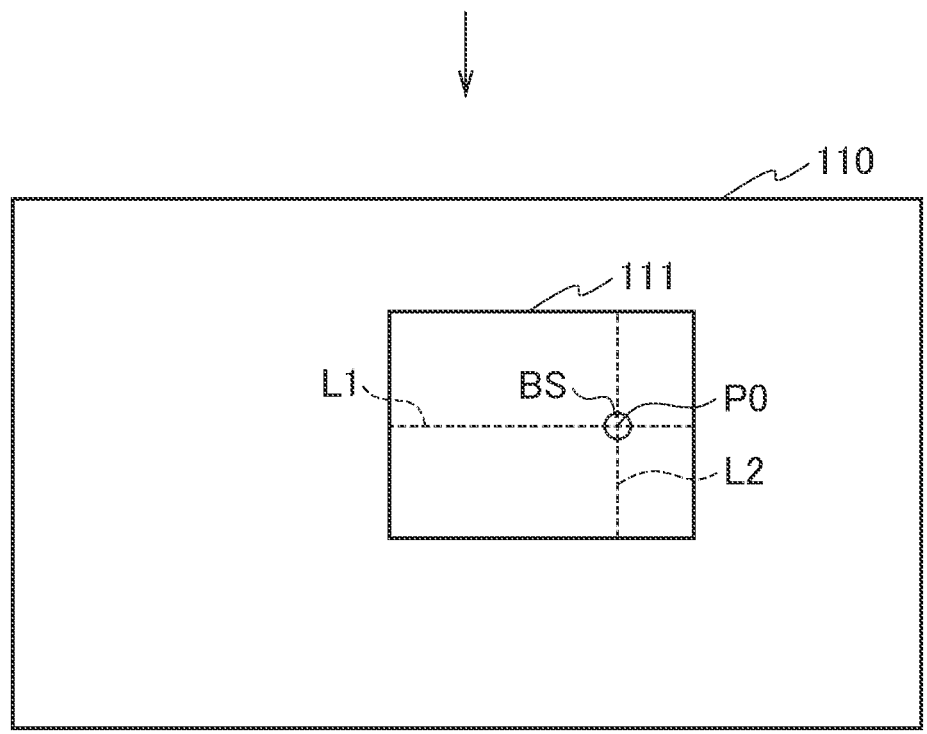

In FIG. 4, a beam spot BS is located in a frame 110 of the image signal obtained by capturing the sheet metals W1 and W2 by the camera 11. The beam spot BS is irradiated to the boundary between the sheet metals W1 and W2 as welding positions, and the position of the beam spot BS is a welding spot. The frame 110 has a predetermined number of pixels in the horizontal direction and a predetermined number of lines in the vertical direction. The size of the frame 110 is arbitrary.

The image analysis device 20 sets an analysis window 111 for determining whether or not a welding defect has occurred in the frame 110. The analysis window 111 is composed of a plurality of pixels among all of the pixels in the frame 110. The image analysis device 20 sets a reference line L1 in the horizontal direction and a reference line L2 in the vertical direction in the analysis window 111, and sets the intersection point of the reference lines L1 and L2 as the origin P0 of the coordinates (0, 0). The origin P0 functions as a reference point for setting a plurality of regions of interest to be described later in the analysis window 111.

The horizontal direction of the frame 110 and the analysis window 111 is the movement direction of the welding head 10 (the scanning direction of the laser beam), and the vertical direction of the frame 110 and the analysis window 111 is the direction orthogonal to the movement direction of the welding head 10.

In FIG. 4, as in the state shown in (a), the center of the beam spot BS may not be located at the origin P0 of the analysis window 111. In such a case, the image analysis device 20 moves the analysis window 111 within the frame 110 so that the origin P0 of the analysis window 111 is positioned at the center of the beam spot BS. As a result, as shown in (b) of FIG. 4, the center of the beam spot BS is located at the origin P0 of the analysis window 111.

Before executing the process of determining whether or not a welding defect has occurred, the image analysis device 20 executes calibration to position the origin P0 of the analysis window 111 at the center of the beam spot BS, as shown in FIG. 4.

Figure 5:
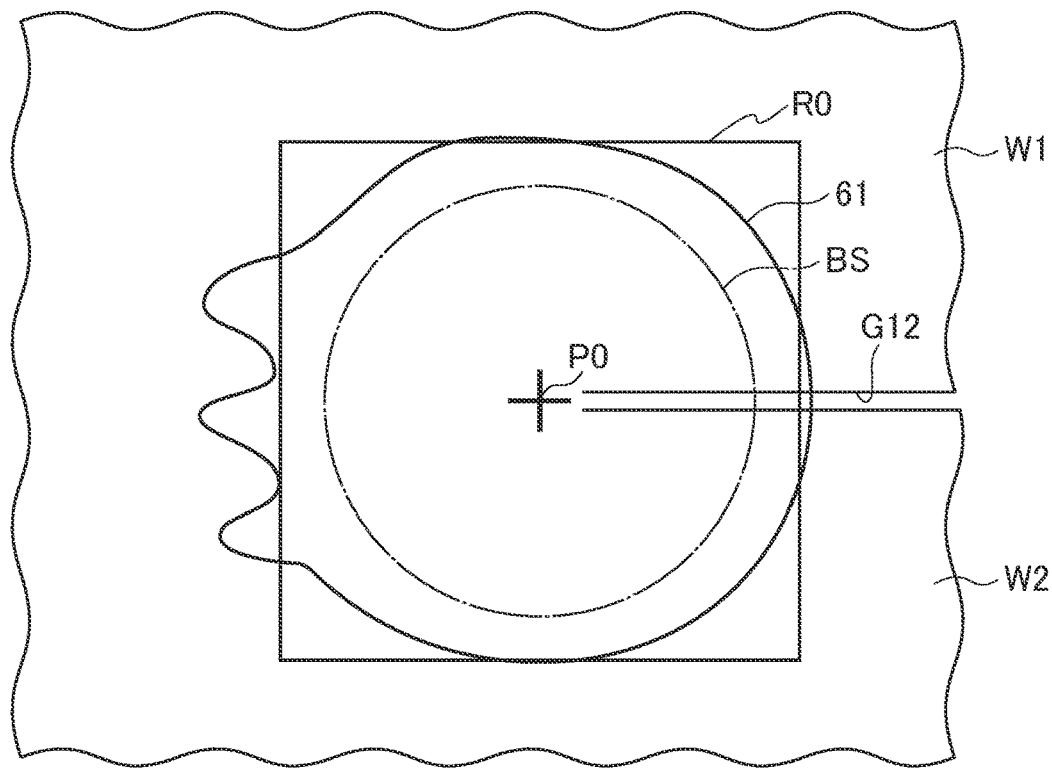
FIG. 5 is a diagram conceptually illustrating the shape of a high luminance region captured by a camera in a state where no welding defect occurs during a butt welding.

FIG. 5 conceptually shows the shape of the high luminance region captured by the camera 11 in a state where welding defects have not occurred as shown in FIG. 2A, during a butt welding of the sheet metals W1 and W2. The laser beam is scanned from the left to the right in FIG. 5, and the boundary between the sheet metals W1 and W2 is welded in the region on the left side of the beam spot BS, and the gap G12 disappears. Note that there is a weld seam Ws formed with a weld bead in the region on the left side of the origin P0; the illustration of the weld seam Ws is omitted in FIG. 5. The same applies to FIG. 6 and the following figures.

By irradiating the boundary between the sheet metals W1 and W2 with the laser beam, a substantially circular region in which the area of the beam spot BS is enlarged around the beam spot BS becomes a high luminance region 61. In the image by the actual image signal, the high luminance region 61 is a white image and the region other than the high luminance region 61 is a black image. The same applies to an image having another high luminance region.

The image analysis device 20 sets a region of interest R0 (a first region of interest) corresponding to the high luminance region 61 in the analysis window 111. It is preferable that the region of interest R0 is set to the size between the inscribed circle and the circumscribed circle of the substantially circular high luminance region 61. The region of interest R0 is the region at the position in the analysis window 111 shown in FIG. 14.

Figure 6:
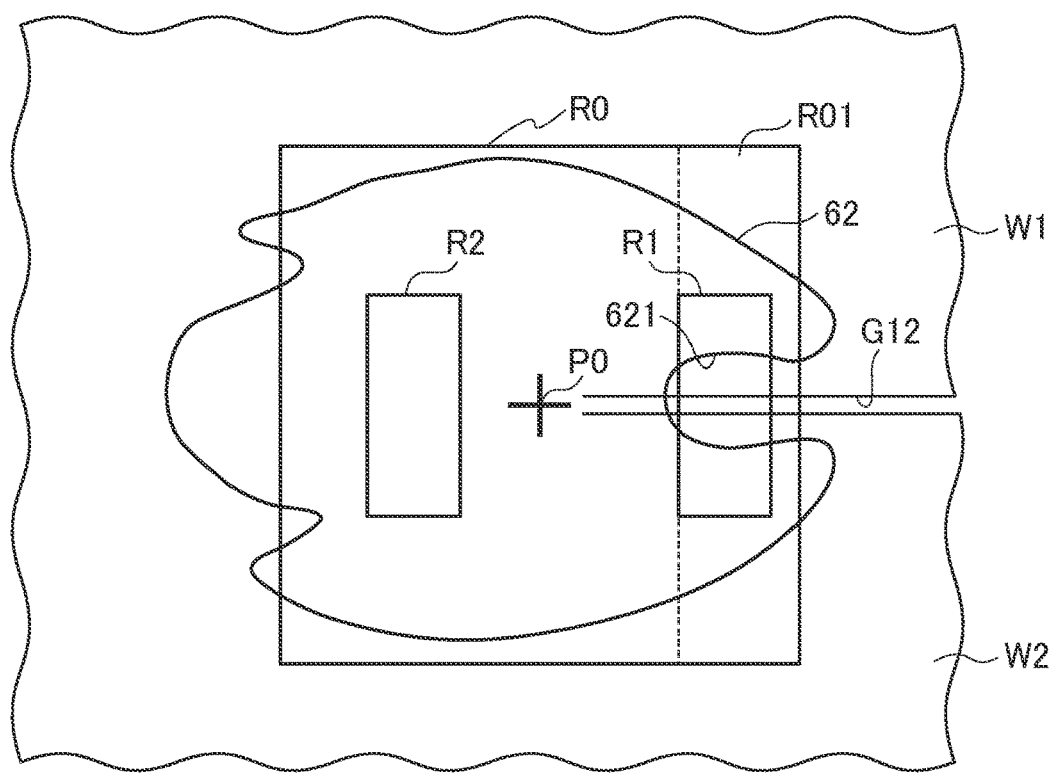
FIG. 6 is a diagram conceptually illustrating the shape of a high luminance region captured by a camera in a state where an underfill has occurred during a butt welding.

FIG. 6 conceptually shows the shape of the high luminance region captured by the camera 11 in a state where the underfill as shown in FIG. 2B as one of the welding defects has occurred, during a butt welding of the sheet metals W1 and W2. The shape of the high luminance region 62 in the state where the underfill has occurred is different from the shape of the high luminance region 61. As shown in FIG. 6, the width in the direction orthogonal to the scanning direction of the high luminance region 62 is narrower than that of the high luminance region 61 shown in FIG. 5, and the high luminance region 62 has a recess 621 recessed toward the rear side in the scanning direction on the gap G12.

The image analysis device 20 sets a region of interest R1 (a second region of interest) located on the front side and a region of interest R2 (a third region of interest) located on the rear side in the scanning direction of the laser beam in the region of interest R0. That is, the regions of interest R1 and R2 overlap the region of interest R0. The region of interest R1 is positioned on the front side of the origin P0, and the region of interest R2 is located on the rear side of the origin P0. The center position in the direction orthogonal to the scanning direction of the regions of interest R1 and R2 is located substantially at the center of the gap G12.

In addition, the image analysis device 20 sets a region of interest R01 in the region of interest R0, which is a region on the front side of the region of interest R0. The region of interest R1 is located in the region of interest R01. That is, the region of interest R01 overlaps the region of interest R0, and the region of interest R1 overlaps the region of interest R01. It is not indispensable for the image analysis device 20 to set the region of interest R01, however, it is preferable to set the region of interest R01 in addition to the regions of interest R1 and R2.

As will be described later, the image analysis device 20 determines whether or not the underfill has occurred based on the luminance at least in the regions of interest R1 and R2, preferably based on the luminance in the regions of interest R1, R2, and R01.

Figure 7:
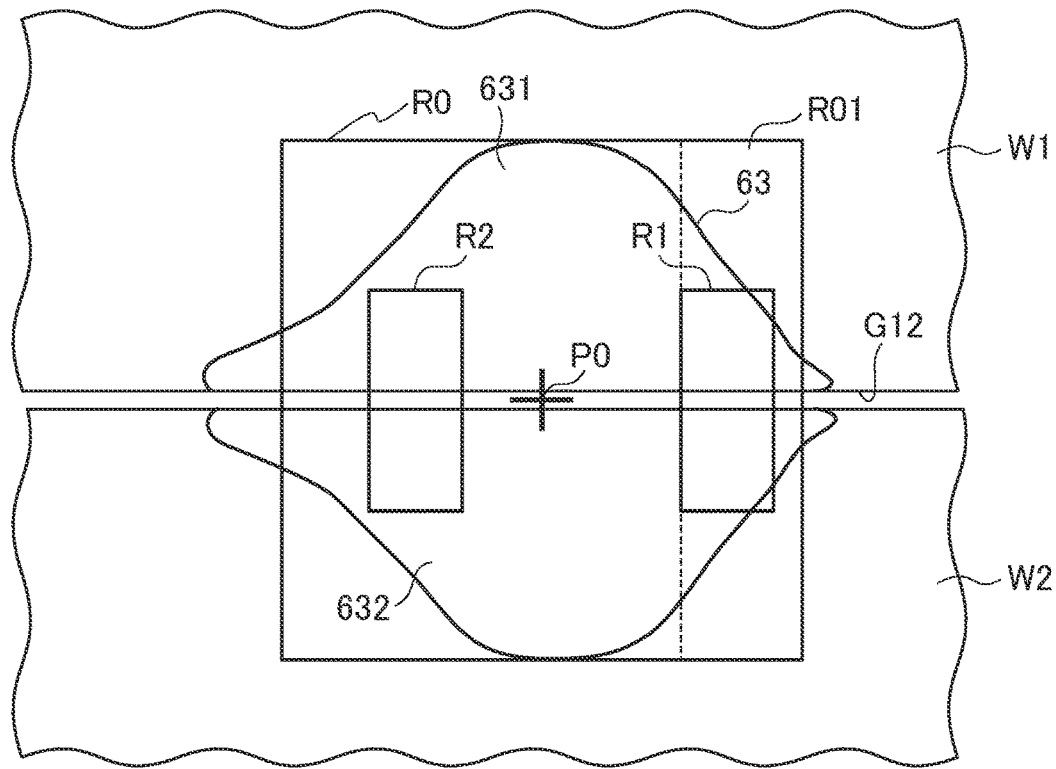
FIG. 7 is a diagram conceptually illustrating the shape of a high luminance region captured by a camera in a state where an unconnected welding defect has occurred during a butt welding.

FIG. 7 conceptually shows the shape of the high luminance region captured by the camera 11 in a state where an unconnected welding defect has occurred as shown in FIG. 2C during a butt welding of the sheet metals W1 and W2. The shape of the high luminance region 63 in a state where an unconnected welding defect has occurred is different from that of the high luminance regions 61 and 62. As shown in FIG. 7, since the gap G12 remains, the high luminance region 63 is divided into a high luminance region 631 on the sheet metal W1 side and a high luminance region 632 on the metal plate W2 side.

Moreover, the high luminance region 63 has a sharp shape on the front side in the scanning direction of the laser beam, and the width in the direction orthogonal to the scanning direction is narrower as compared with the high luminance region 61 shown in FIG. 5.

As will be described later, the image analysis device 20 determines whether or not an unconnected welding defect has occurred based on the luminance at least in the regions of interest R1 and R2, preferably based on the luminance in the regions of interest R1, R2, and R01.

Figure 8:
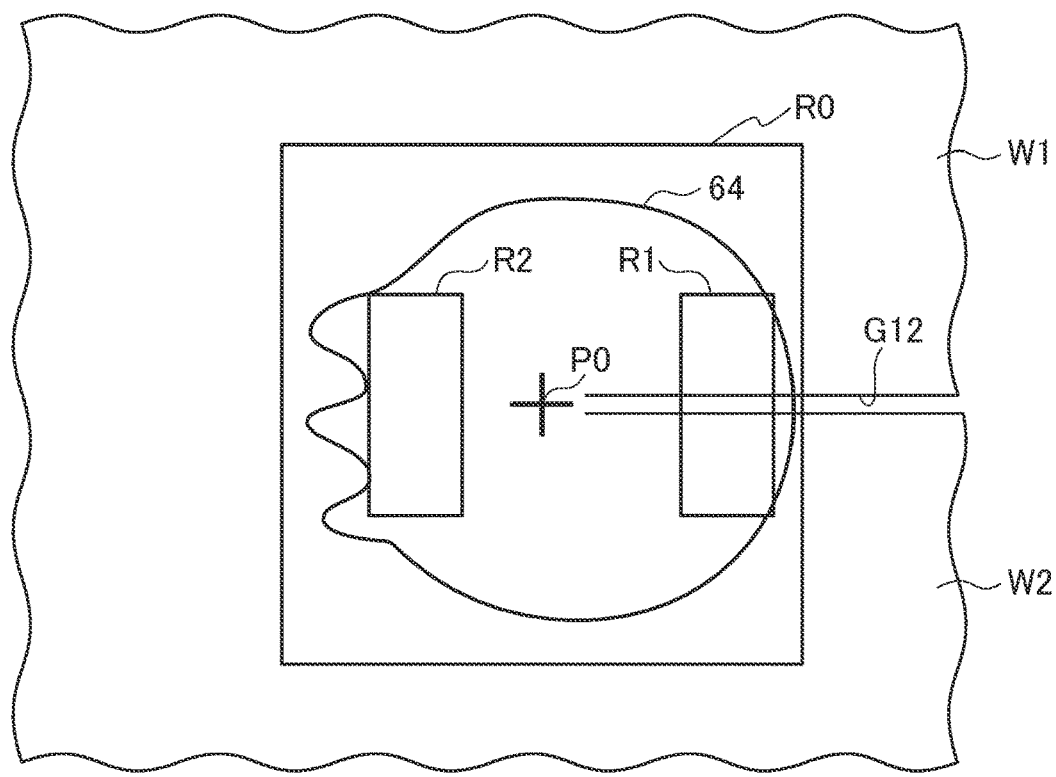
FIG. 8 is a diagram conceptually illustrating the shape of a high luminance region captured by a camera in a state where a welding defect of insufficient penetration has occurred during a butt welding.

FIG. 8 conceptually shows the shape of the high luminance region captured by the camera 11 in a state where a welding defect of insufficient penetration has occurred as shown in FIG. 2D during a butt welding of the sheet metals W1 and W2. The shape of the high luminance region 64 in a state where a welding defect of insufficient penetration has occurred is substantially circular like the high luminance region 61, however the size of the high luminance region 64 is smaller than that of the high luminance region 61.

As will be described later, the image analysis device 20 determines whether or not a welding defect of insufficient penetration has occurred based on the luminance in the regions of interest R0, preferably based on the luminance in the regions of interest R0, R1, and R2.

Figure 9:
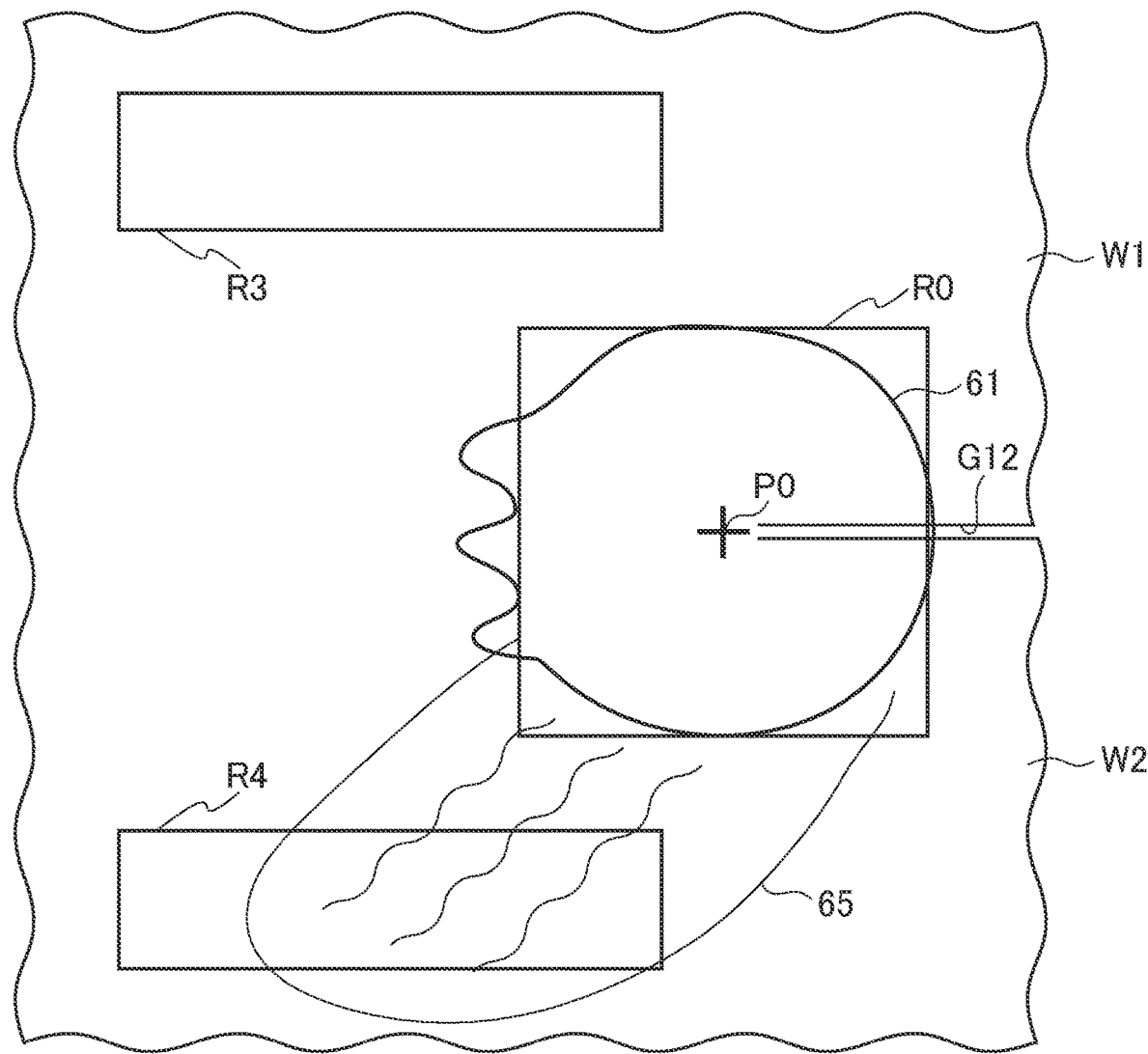
FIG. 9 is a diagram conceptually illustrating the shape of a high luminance region captured by a camera in a state where a welding defect of edge displacement has occurred during a butt welding.

FIG. 9 conceptually shows the shape of the high luminance region captured by the camera 11 in a state where a welding defect of edge displacement has occurred as shown in FIG. 2E during a butt welding of the sheet metals W1 and W2. In FIG. 9, similarly to FIG. 5, a welding defect itself has not occurred, and a substantially circular high luminance region 61 is captured. The example shown in FIG. 9 shows a case where an edge displacement in which the sheet metal W2 is displaced downward from the sheet metal W1 has occurred, as shown in FIG. 2E.

When such an edge displacement has occurred, the evaporated gas (welding fumes) generated by welding the sheet metals W1 and W2 flows more to the sheet metal on the side displaced downward. As a result, as shown in FIG. 9, the high luminance region 65 is generated by the evaporated gas flowing more on the sheet metal W2 side. The high luminance region 65 indicated by the thin solid line is not as high as the luminance in the high luminance region 61, however it has high luminance as compared with the surroundings, resulting in a smoky, blurred, white image.

The image analysis device 20 sets a region of interest R3 (a fourth region of interest) and a region of interest R4 (a fifth region of interest) at a position distant by a predetermined distance in the direction orthogonal to the scanning direction from the gap G 12, on the rear side of the region of interest R0 in the scanning direction of the laser beam.

The regions of interest R3 and R4 sandwich the region of interest R0. The end portions on the front side in the scanning direction of the regions of interest R3 and R4 overlap the end portion on the rear side of the region of interest R0 in the scanning direction. The regions of interest R3 and R4 are separated from the region of interest R0 in a direction orthogonal to the scanning direction. The regions of interest R3 and R4 are regions at the position shown in FIG. 14 in the analysis window 111.

As will be described later, the image analysis device 20 determines whether or not a welding defect of edge displacement has occurred based on the luminance in the regions of interest R3 and R4.

Figure 10:
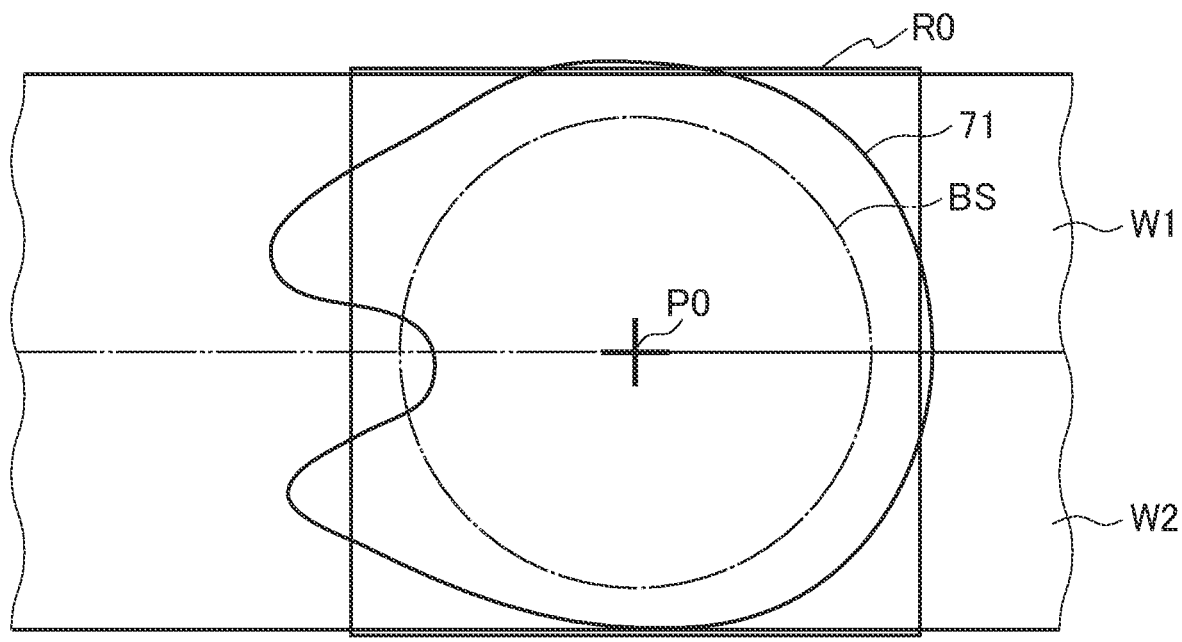
FIG. 10 is a diagram conceptually illustrating the shape of a high luminance region captured by a camera in a state where no welding defect has occurred during a welding of a corner joint.

FIG. 10 conceptually shows the shape of the high luminance region captured by the camera 11 in a state where no welding defect has occurred as shown in FIG. 3A during a welding of a corner joint of the sheet metals W1 and W2. The laser beam is scanned from the left to the right in FIG. 10, and the boundary of the sheet metals W1 and W2 is welded in the region on the left side of the beam spot BS. In the region on the left side of the origin P0, the boundary of the sheet metals W1 and W2 disappears. The disappeared boundary between the sheet metals W1 and W2 is indicated by a thick two-dot chain line.

As similar to FIG. 5, by irradiating the boundary between the sheet metals W1 and W2 with the laser beam, a substantially circular region in which the area of the beam spot BS is enlarged around the beam spot BS becomes a high luminance region 71. In addition, as similar to FIG. 5, the image analysis device 20 sets a region of interest R0 corresponding to the high luminance region 71 in the analysis window 111.

Figure 11:
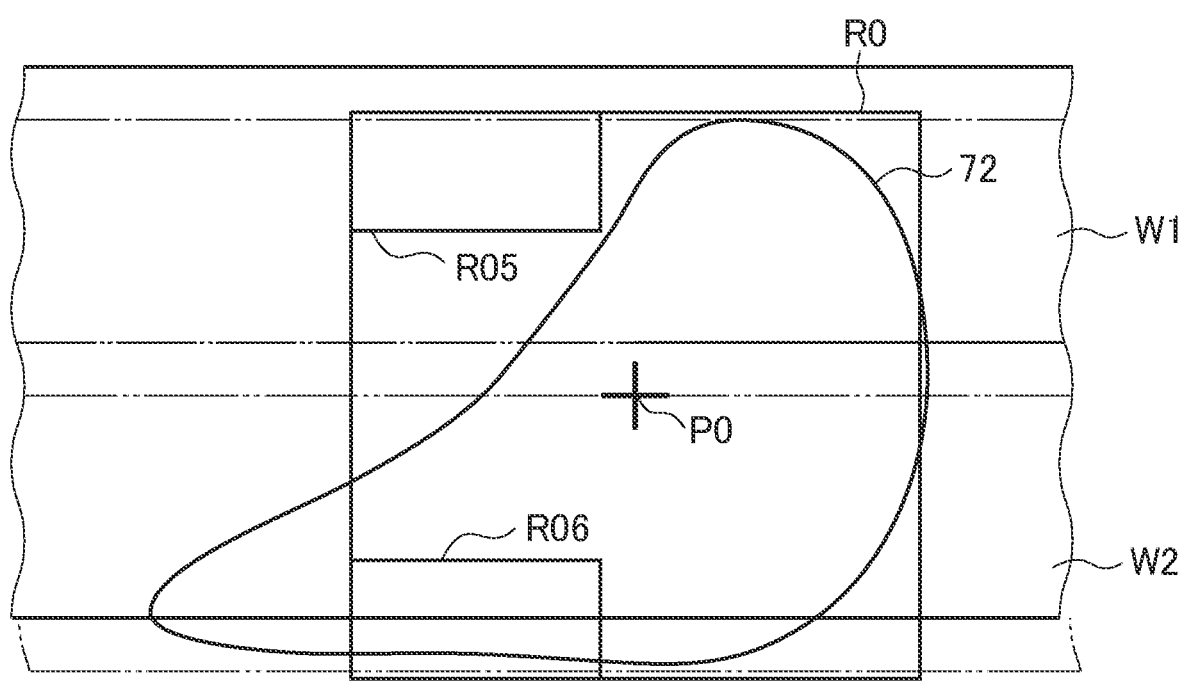
FIG. 11 is a diagram conceptually illustrating the shape of a high luminance region captured by a camera in a state where a welding defect of a narrow welding seam has occurred during a welding of a corner joint.

FIG. 11 conceptually shows the shape of the high luminance region captured by the camera 11 in a state where a welding defect of a narrow welding seam has occurred as shown in FIG. 3B during the welding of a corner joint of the sheet metals W1 and W2. The shape of a high luminance region 72 in a state where a welding defect of a narrow welding seam has occurred is different from the shape of the high luminance area 71.

As shown in FIG. 11, originally, the center of the beam spot BS (that is, the origin P0) has to be located at the boundary between the sheet metals W1 and W2 indicated by a thin two-dot chain line. The welding defect of a narrow welding seam is caused by welding processing executed with the center of the beam spot BS displaced to the side of one sheet metal (sheet metal W2 in this case).

As shown in FIG. 11, the high luminance region 72 is biased to the front side in the scanning direction on the sheet metal W1 side, and is biased toward the rear side in the scanning direction on the sheet metal W2 side, and has a shape extending toward the rear side.

The image analysis device 20 sets a region of interest R05 (a sixth region of interest) and a region of interest R06 (a seventh region of interest) in the region of interest R0, which are separated from each other in the direction orthogonal to the scanning direction on the rear side in the scanning direction of the region of interest R0. In the example shown in FIG. 11, the regions of interest R05 and R06 are located at the rear end portion of the region of interest R0, and at both ends of the region of interest R0 in a direction orthogonal to the scanning direction. As will be described later, the image analysis device 20 determines whether or not a welding defect of a narrow welding seam has occurred based on the luminance in the regions of interest R05 and R06.

Figure 12:
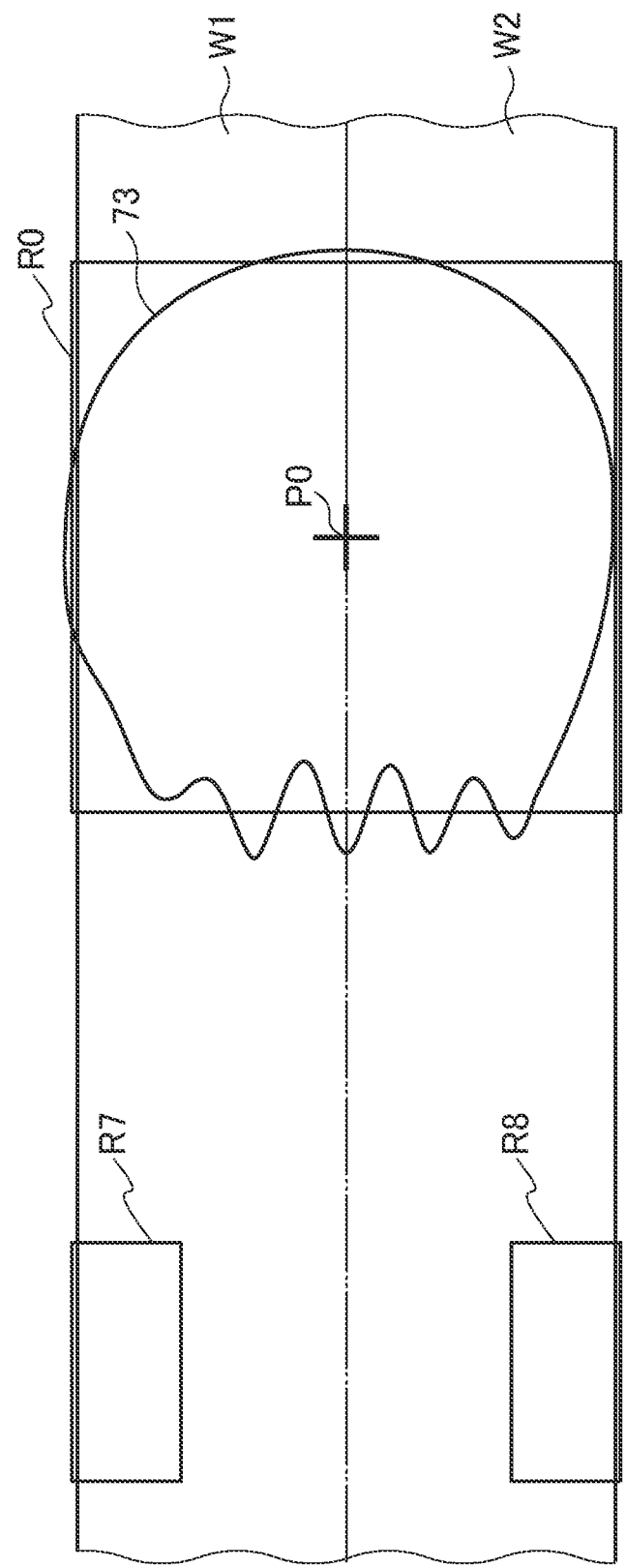
FIG. 12 is a diagram conceptually illustrating the shape of a high luminance region captured by a camera in a state where a welding defect of a flat welding seam has occurred during a welding of a corner joint.

FIG. 12 conceptually shows the shape of the high luminance region captured by the camera 11 in a state where a welding defect of a flat welding seam has occurred as shown in FIG. 3C during a welding of a corner joint of the sheet metals W1 and W2. The shape of a high luminance region 73 in a state where the welding defect of a flat welding seam has occurred is substantially circular.

The image analysis device 20 sets a region of interest R7 (an eighth region of interest) and a region of interest R8 (a ninth region of interest) on the rear side in the scanning direction of the region of interest R0, and at a position away from the boundary of the sheet metals W1 and W2. The regions of interest R7 and R8 are separated in a direction orthogonal to the scanning direction. The distance in the scanning direction between the region of interest R0 and the regions of interest R7 and R8 is approximately equal to the width of the region of interest R0 in the scanning direction. The regions of interest R7 and R8 are regions at the position shown in FIG. 14 in the analysis window 111.

In FIG. 12, the region of interest R7 is shown to be located at the end of the end face of the sheet metal W1 away from the sheet metal W2, and the region of interest R8 is shown to be located at the end of the end surface of the sheet metal W2 away from the sheet metal W1. Actually, since both end faces of the sheet metals W1 and W2 are melted to form the welding seam Ws, the regions of interest R7 and R8 respectively correspond to the regions SW1 and 6W2 in FIG. 3C.

As will be described later, the image analysis device 20 determines whether or not a welding defect of a flat welding seam has occurred based on the luminance in the regions of interest R7 and R8. Note that when determining whether or not a welding defect of a flat welding seam has occurred, the illumination by the illumination device 13 is controlled to be on. It is not indispensable to control the illumination on to determine whether or not a welding defect of a flat welding seam has occurred, it is preferable to control it on.

Figure 13:
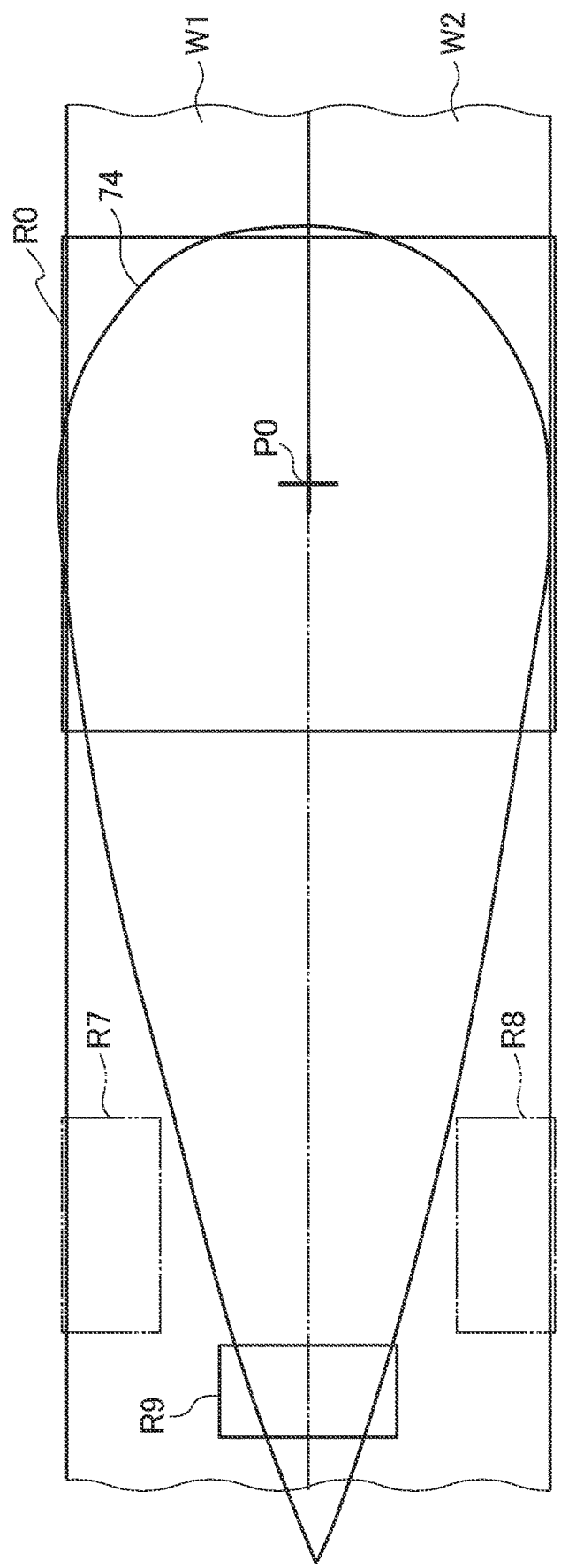
FIG. 13 is a diagram conceptually illustrating the shape of a high luminance region captured by a camera in a state where a welding defect of excessive melting has occurred during a welding of a corner joint.

FIG. 13 conceptually shows the shape of the high luminance region captured by the camera 11 in a state where a welding defect of excessive melting has occurred as shown in FIG. 3D during a welding of a corner joint of the sheet metals W1 and W2. The shape of a high luminance region 74 in a state where a welding defect of excessive melting has occurred is greatly different from the shape of the high luminance regions 71 to 73. The high luminance region 74 has a shape elongated to the rear side in the scanning direction of the laser beam.

The image analysis device 20 sets a region of interest R9 (a tenth region of interest) so as to straddle the boundary between the sheet metals W1 and W2 on the rear side of the region of interest R0, and further on the rear side of the regions of interest R7 and R8. The central position in the direction orthogonal to the scanning direction of the region of interest R9 is located substantially at the boundary between the sheet metals W1 and W2. The region of interest R9 is a region at the position shown in FIG. 14 in the analysis window 111.

As will be described later, the image analysis device 20 determines whether or not a welding defect of excessive melting has occurred based on the luminance in the region of interest R9. Note that when determining whether or not a welding defect of excessive melting has occurred, the illumination by the illumination device 13 is controlled to be on. It is not indispensable to control the illumination on to determine whether or not a welding defect of excessive melting has occurred, it is preferable to control it on.

Referring to FIG. 14 again, the image analysis device 20 sets the regions of interest R0 to R4, R7 to R9, R01, R05, and R06 for determining whether or not each welding defect in FIGS. 2B to 2E and FIGS. 3B to 3D has occurred in the analysis window 111. Since the origin P0 is set to the coordinates (0, 0), the positions of the regions of interest R0 to R4, R7 to R9, R01, R05, and R06, and the range of each region of interest in the analysis window 111 are specified by positive or negative coordinates in the horizontal and vertical directions.

The coordinates (region designation data) for specifying the position and the range of each region of interest are stored in the database 30 shown in FIG. 1, as one piece of information used when the image analysis device 20 analyzes the image signal. The thresholds for determining whether or not each welding defect has occurred are stored in the database 30, as another piece of information.

In addition, the information (image capturing condition setting data) for setting image capturing conditions when the camera 11 captures the sheet metals W (W1 and W2), and the information (lens position setting data) for setting the position of the image focusing lens 16 are stored in the database 30, as other information. One of the image capturing conditions is a shutter speed, for example. Furthermore, the setting information (illumination on/off setting data) for turning on or off the illumination by the illumination device 13, which is set for each type of welding defect, is stored in the database 30.

Figure 15:
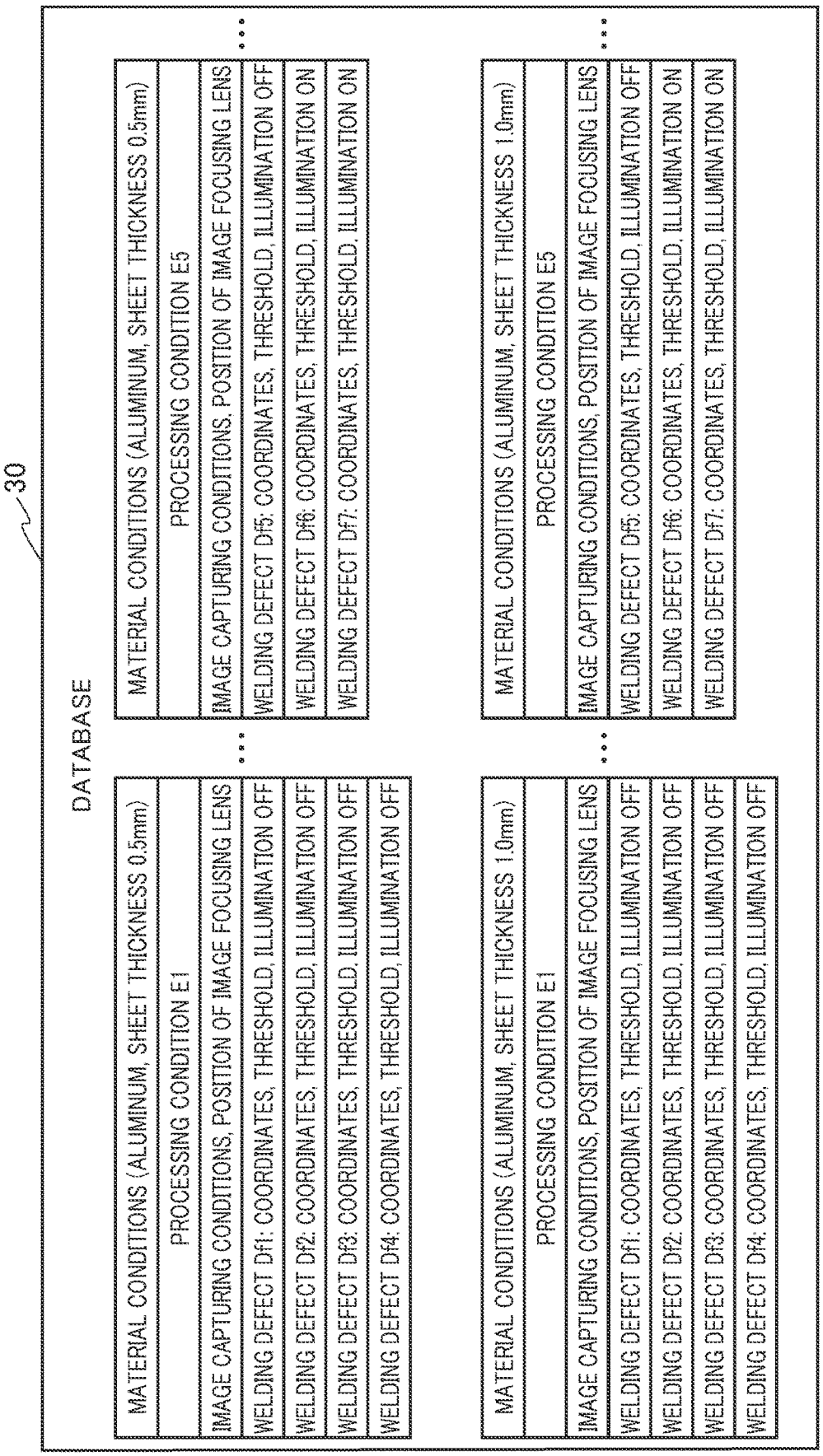
FIG. 15 is a diagram conceptually illustrating various kinds of information stored in a database.

As shown in FIG. 15, it is preferable that the image capturing conditions, the position of the image focusing lens 16, the coordinates of each region of interest, the threshold for each region of interest, and illumination on or off are set in correspondence with the material conditions and the processing conditions of the sheet metals W in the database 30. Here, as the material conditions, a combination of a material of the sheet metal W and a plate thickness is set, and aluminum (or aluminum alloy) having a thickness of 0.5 mm and aluminum (or aluminum alloy) having a thickness of 1.0 mm are exemplified. Material symbols such as A5052 may be used as the material conditions.

The processing conditions are represented by the processing condition numbers such as E1, E2, E3 . . . , for example, and various kinds of processing conditions such as the moving speed of the welding head 10, the laser power of the laser oscillator 1, the oscillation frequency of the laser beam, the nozzle gap, setting of the butt welding or the welding of a corner joint and the like are set in correspondence with the processing condition numbers.

Welding defects Df1 to Df4 shown in FIG. 15 indicate the underfill, the unconnected welding defect, the insufficient penetration, and the edge displacement, respectively, in the butt welding, and welding defects Df5 to Df7 indicate the a narrow welding seam, the a flat welding seam, and the excessive melting, respectively, in the welding of a corner joint. As an example, the processing condition E1 indicates the processing condition of the butt welding, and the processing condition E5 indicates the processing condition of the welding of a corner joint. The coordinates of the region of interest, the threshold, and the turning on or off of the illumination for determining each welding defect are set in correspondence with the welding defects Df1 to Df4 and Df5 to Df7.

It is preferable that at least image capturing conditions of the camera 11, the position of each region of interest, the threshold for determining whether or not each welding defect has occurred are set in correspondence with the material conditions of the sheet metals W1 and W2 and the processing conditions. The position of the image focusing lens 16 or the setting information of the illumination on or off may be included in the image capturing conditions of the camera 11.

Figure 16:
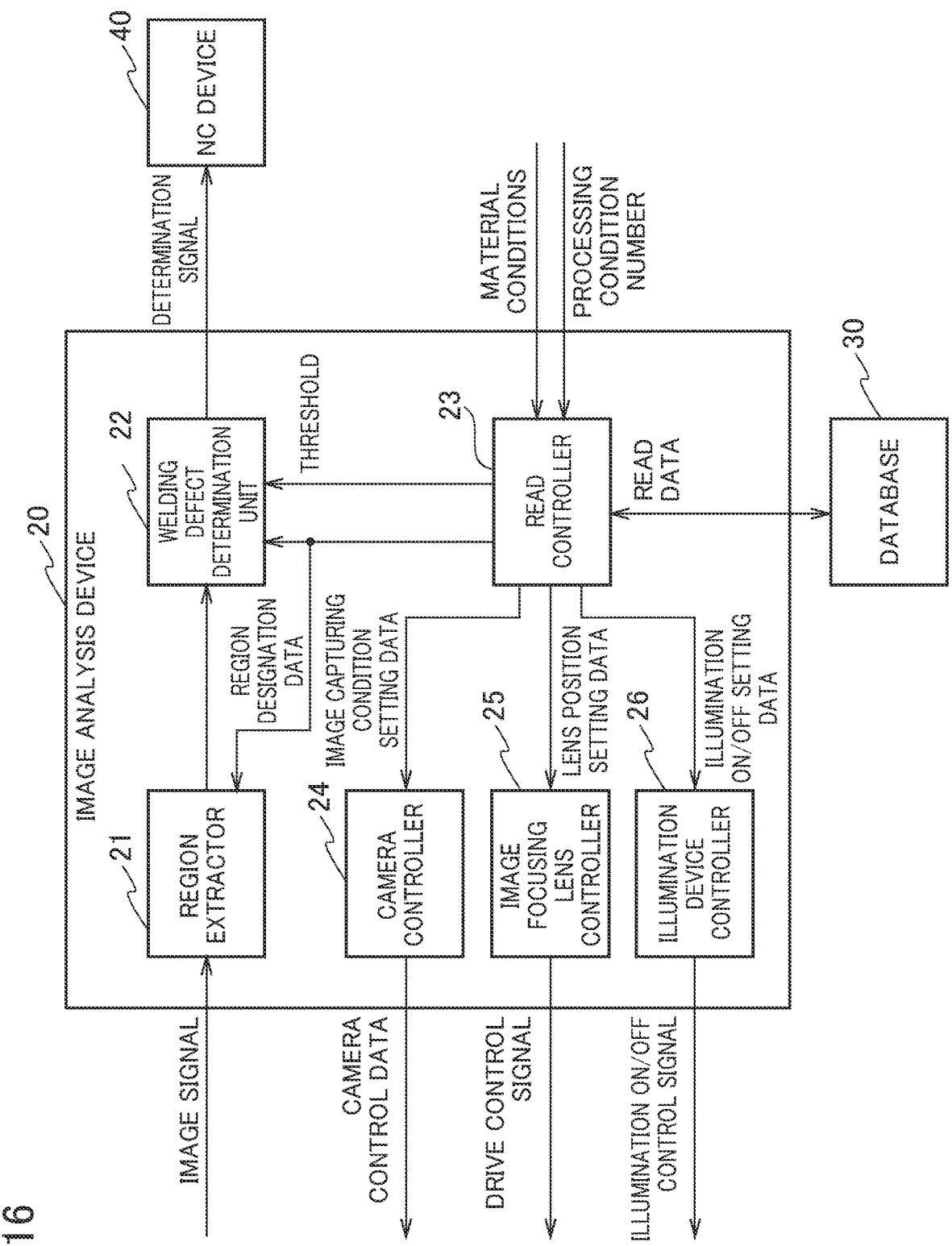
FIG. 16 is a block diagram illustrating an example of a functional internal configuration of an image analysis device provided in a laser welding machine according to one or more embodiments.

FIG. 16 shows the functional internal configuration of the image analysis device 20. The image analysis device 20 includes a region extractor 21, a welding defect determination unit 22, a read controller 23, a camera controller 24, an image focusing lens controller 25, and an illumination device controller 26. An image signal obtained by capturing the sheet metals W by the camera 11 is input to the region extractor 21.

The material conditions and the processing condition number input by the operation unit 52 are input to the read controller 23. The read controller 23 reads the region designation data, the threshold, the image capturing condition setting data, the lens position setting data, and the illumination on/off setting data. The read controller 23 supplies the region designation data to both the region extractor 21 and the welding defect determination unit 22, and supplies the threshold to the welding defect determination unit 22, out of the read data read from the database 30. In addition, the read controller 23 supplies the image capturing condition setting data, the lens position setting data, and the illumination on/off setting data to the camera controller 24, the image focusing lens controller 25, and the illumination device controller 26, respectively.

The region extractor 21 extracts pixels of each region of interest for determining each welding defect out of the pixels included in the analysis window 111 in each frame 110 of the input image signal, based on the region designation data, and supplies the extracted pixels to the welding defect determination unit 22.

Figure 14:
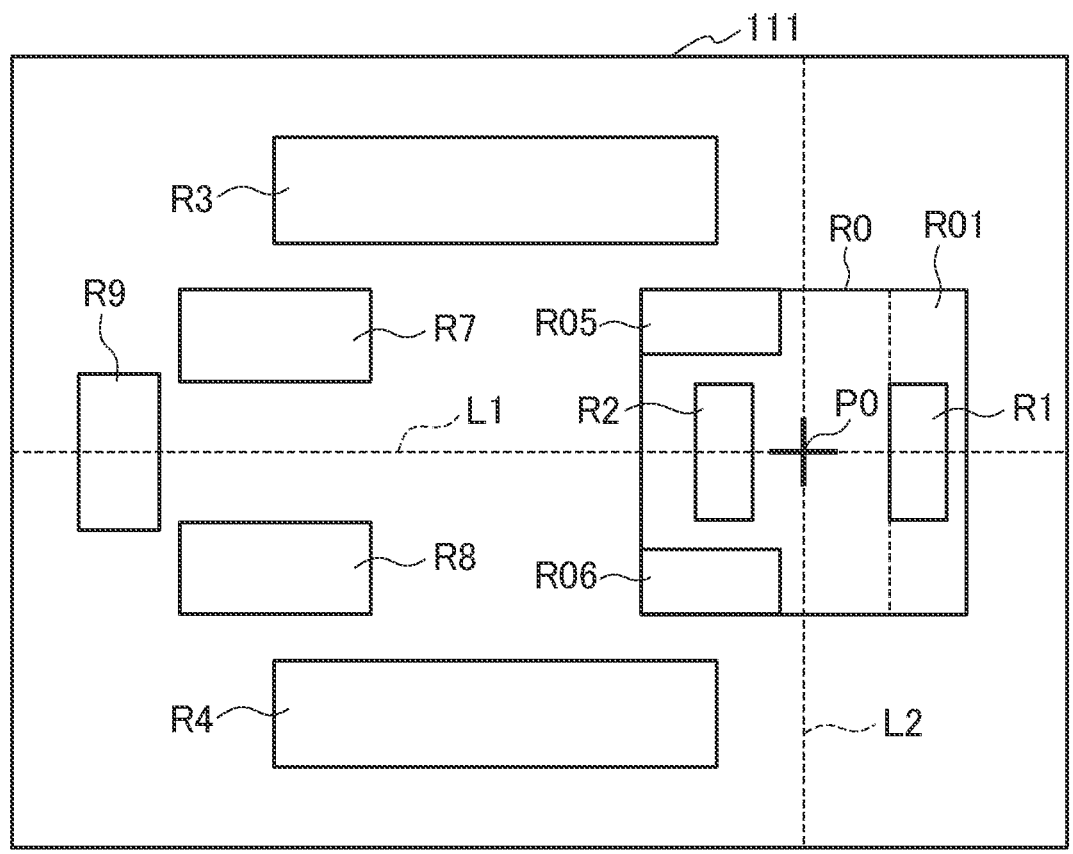
FIG. 14 is a diagram illustrating the positions of a plurality of regions of interest set in the analysis window.

In order for the welding defect determination unit 22 to determine each welding defect in the butt welding, it suffices if there are pixels of the regions of interest R0 to R4 and R01 shown in FIG. 14. Since the regions of interest R1, R2, and R01 are located in the region of interest R0, the region extractor 21 extracts the pixels of the regions of interest R0, R3, and R4, and supplies the extracted pixels to the welding defect determination unit 22. In order for the welding defect determination unit 22 to determine each welding defect in the welding of a corner joint, it suffices if there are pixels of the regions of interest R05, R06, and R7 to R09 shown in FIG. 14. The region extractor 21 extracts the pixels of the regions of interest R05, R06, and R7 to R09, and supplies the extracted pixels to the welding defect determination unit 22.

When determining each welding defect in the butt welding, the welding defect determination unit 22 determines whether or not each welding defect has occurred, based on the luminance in the region of interest R0, the regions of interest R1, R2, and R01, or the regions of interest R3 and R4. When determining each welding defect in the welding of a corner joint, the welding defect determination unit 22 determines whether or not each welding defect has occurred, based on the luminance in the regions of interest R05 and R06, the regions of interest R7 and R8, or the region of interest R9. A specific determination method will be described in detail later.

The camera controller 24 generates camera control data based on the input image capturing condition setting data, and supplies the camera control data to the camera 11 to control the camera 11. The image focusing lens controller 25 generates a drive control signal for moving the image focusing lens 16 based on the input lens position setting data, and supplies the drive control signal to the driver 15. The illumination device controller 26 generates an illumination on/off control signal for turning on or off the illumination by the illumination device 13 based on the input illumination on/off setting data, and supplies the illumination on/off control signal to the illumination device 13.

Here, a specific determination method for determining whether or not each welding defect has occurred will be described. First, a method of determining each welding defect in the butt welding will be described.

The welding defect determination unit 22 determines that the captured image is in the state as shown in FIG. 6 and the underfill shown in FIG. 2B has occurred, if the condition that the luminance in the region of interest R1 is lower than a first threshold and the luminance in the region of interest R2 is higher than the first threshold is satisfied. The welding defect determination unit 22 may determine that the underfill has occurred, if the condition that the luminance in the region of interest R1 is lower than the first threshold, the luminance in the region of interest R2 is higher than the first threshold, and the luminance in the region of interest R01 is lower than a predetermined threshold. The threshold used for the region of interest R01 is different from the first threshold.

The recess 621 of the high luminance region 62 shown in FIG. 6 may be small. It is possible to determine whether or not the underfill has occurred by adding a condition that the luminance in the region of interest R01 is lower than the predetermined threshold, even when the recess 621 is small. Therefore, it is preferable that the region of interest R01 is used in addition to the regions of interest R1 and R2.

In order to increase the accuracy of the determination, the welding defect determination unit 22 preferably determines that the underfill has occurred when the above-described condition is satisfied in a plurality of frames. The number of frames for determining that the underfill has occurred is five frames, for example. The welding defect determination unit 22 may determine the occurrence of the underfill in such a way that, when the above-described condition is satisfied, the count value by a counter is incremented by 1, when the above-described condition is not satisfied, the count value is decremented by 1, and when the count value becomes 5, the underfill has occurred. The welding defect determination unit 22 may determine that the underfill has occurred if the above-described conditions are satisfied continuously for a predetermined number of frames (5 frames for example).

Incidentally, the luminance in each region of interest may be the integral value of the pixel values of all the pixels included in each region of interest, or the average value of the pixel values of all the pixels included in each region of interest.

The welding defect determination unit 22 determines that the captured image is in the state as shown in FIG. 7, and that the unconnected welding defect shown in FIG. 2C has occurred, if the condition that the luminance in the region of interest R1 is lower than the second threshold and the luminance in the region of interest R2 is lower than the second threshold is satisfied. The second threshold may be the same as or different from the first threshold.

The welding defect determination unit 22 may determine that the unconnected welding defect has occurred, if the condition that the luminance in the region of interest R1 is lower than the second threshold, the luminance in the region of interest R2 is lower than the second threshold, and the luminance in the region of interest R01 is lower than the predetermined threshold is satisfied. The threshold used for the region of interest R01 to determine whether or not the unconnected welding defect has occurred may be the same as or different from the threshold used for the region of interest R01 to determine whether or not the underfill has occurred.

The welding defect determination unit 22 determines that the captured image is in the state as shown in FIG. 8, and that the welding defect of insufficient penetration shown in FIG. 2D has occurred, if the condition that the luminance in the region of interest R0 is lower than the third threshold is satisfied. The welding defect determination unit 22 may determine that the welding defect of insufficient penetration has occurred, if the condition that the luminance in the region of interest R0 is lower than the third threshold and the luminance in the regions of interest R1 and R2 is higher than a predetermined threshold is satisfied. The threshold used for the regions of interest R1 and R2 may be the same as or different from the first threshold.

The welding defect determination unit 22 determines that the captured image is in the state as shown in FIG. 9, and that the welding defect of edge displacement shown in FIG. 2E has occurred, if the condition that the difference between the luminance in the region of interest R3 and the luminance in the region of interest R4 is equal to or greater than the fourth threshold is satisfied. The fourth threshold may be a ratio representing the difference in luminance between the regions of interest R3 and R4, or may be a difference value of luminance between the regions of interest R3 and R4. In the former case, as an example, if the luminance in the region of interest R3 differs from the luminance in the region of interest R4 by 5% or more, the welding defect determination unit 22 determines that the welding defect of edge displacement has occurred.

Similarly to the determination of the underfill occurrence, in order to increase the accuracy of the determination, the welding defect determination unit 22 preferably determines that the unconnected welding defect, the insufficient penetration, or the edge displacement has occurred, when the condition for determining each defect is satisfied in a plurality of frames.

Next, a method of determining each welding defect in the welding of a corner joint will be described. The welding defect determination unit 22 determines that the captured image is in the state as shown in FIG. 11, and that the welding defect of a narrow welding seam shown in FIG. 3B has occurred, if the condition that the difference between the luminance in the region of interest R05 and the luminance in the region of interest R06 is equal to or greater than the fifth threshold is satisfied. The fifth threshold may be a ratio representing the difference in luminance between the regions of interest R05 and R06, or may be a difference value of luminance between the regions of interest R05 and R06.

The welding defect determination unit 22 determines that the captured image is in the state as shown in FIG. 12, and that the welding defect of a flat welding seam shown in FIG. 3C has occurred, in the state where the illumination by the illumination device 13 turned on, if the condition that the difference between the luminance in the regions of interest R7 and R8 is lower than the sixth threshold is satisfied. When the welding defect of a flat welding seam has occurred, the regions of interest R7 and R8 are dark even when the sheet metals W1 and W2 are irradiated with the illumination light. Therefore, the welding defect determination unit 22 can determine whether or not the welding defect of a flat welding seam has occurred by comparing the luminance in the regions of interest R7 and R8 with the sixth threshold.

The welding defect determination unit 22 determines that the captured image is in the state as shown in FIG. 13, and that the welding defect of excessive melting shown in FIG. 3D has occurred, in the state where the illumination by the illumination device 13 turned on, if the condition that the luminance in the region of interest R9 is higher than the seventh threshold is satisfied.

Similarly to the determination of welding defects in the butt welding, in order to increase the accuracy of the determination, the welding defect determination unit 22 preferably determines that the welding defect of a narrow welding seam, a flat welding seam, or excessive melting has occurred, when the condition for determining each defect is satisfied in a plurality of frames.

Figure 17A:
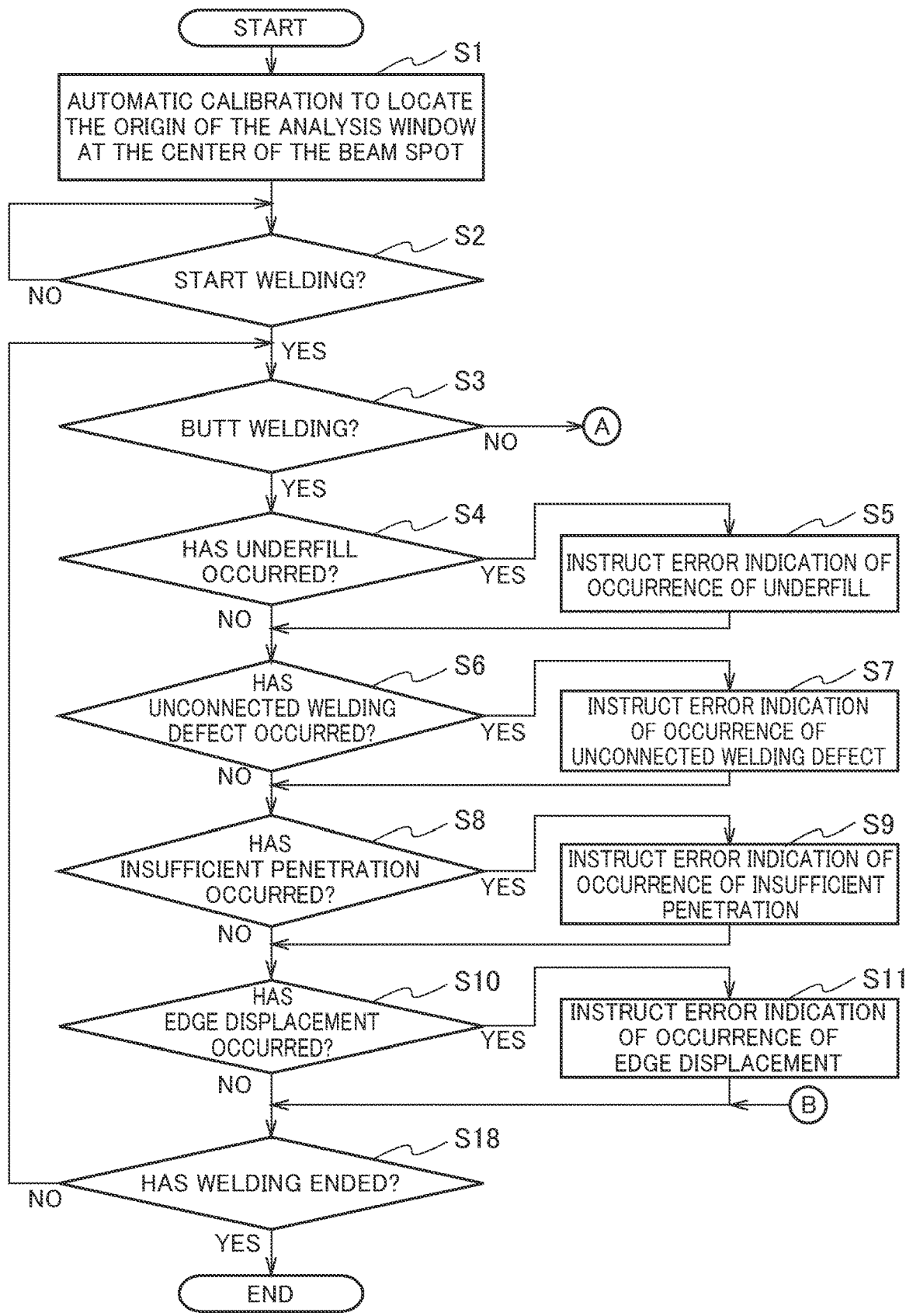
FIG. 17A is a partial flowchart illustrating a weld state monitoring method according to one or more embodiments.

With reference to the flowcharts shown in FIGS. 17A and 17B, the weld state monitoring method executed by the image analysis device 20 will be described. When the NC device 40 activates the laser welding machine, the image analysis device 20 starts the monitoring process shown in FIGS. 17A and 17B. In FIG. 17A, the image analysis device 20 automatically performs calibration so that the origin P0 of the analysis window 111 is positioned at the center of the beam spot BS in step S1.

In step S2, the image analysis device 20 determines whether or not welding has been started based on the information supplied from the NC device 40. If welding has not been started (NO), the image analysis device 20 repeats the process of step S2. If welding has started (YES), the image analysis device 20 determines whether or not the welding to be executed is a butt welding in step S3.

If the welding is the butt welding (YES), in step S4, the image analysis device 20 determines whether or not an underfill has occurred. If an underfill has occurred (YES), in step S5, the image analysis device 20 instructs the NC device 40 to display an error indicating that an underfill has occurred on the display 51, and shifts the process to step S6. If an underfill has not occurred (NO), the image analysis device 20 shifts the process to step S6.

In step S6, the image analysis device 20 determines whether or not an unconnected welding defect has occurred. If an unconnected welding defect has occurred (YES), in step S7, the image analysis device 20 instructs the NC device 40 to display an error indicating that an unconnected welding defect has occurred on the display 51, and shifts the process to step S8. If an unconnected welding defect has not occurred (NO), the image analysis device 20 shifts the process to step S8.

In step S8, the image analysis device 20 determines whether or not a welding defect of insufficient penetration has occurred. If a welding defect of insufficient penetration has occurred (YES), in step S9, the image analysis device 20 instructs the NC device 40 to display an error indicating that a welding defect of insufficient penetration has occurred on the display 51, and shifts the process to step S10. If a welding defect of insufficient penetration has not occurred (NO), the image analysis device 20 shifts the process to step S10.

In step S10, the image analysis device 20 determines whether or not a welding defect of edge displacement has occurred. If a welding defect of edge displacement has occurred (YES), in step S11, the image analysis device 20 instructs the NC device 40 to display an error indicating that a welding defect of edge displacement has occurred on the display 51, and shifts the process to step S18. If a welding defect of edge displacement has not occurred (NO), the image analysis device 20 shifts the process to step S18.

Figure 17B:
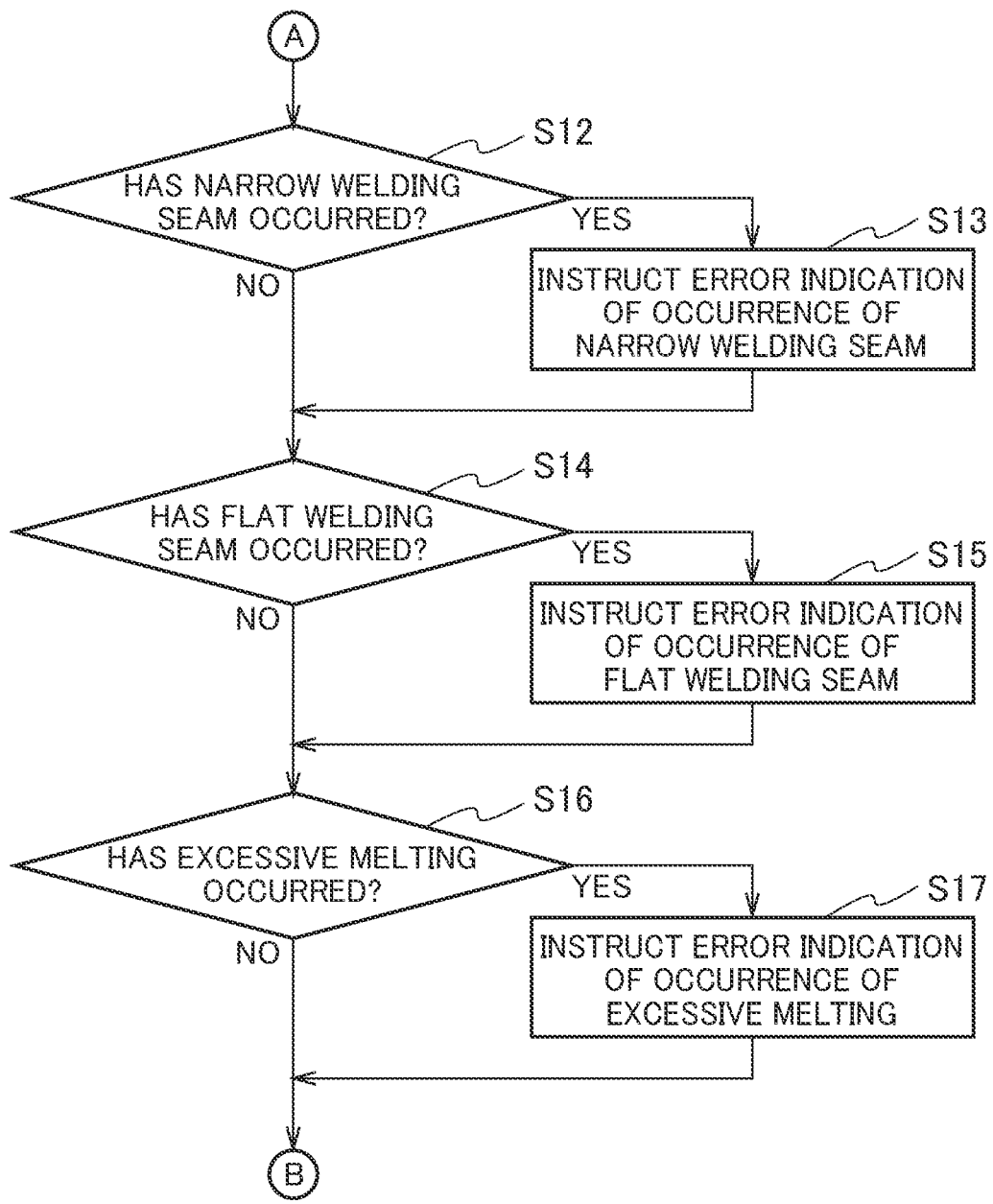
FIG. 17B is a remaining partial flowchart illustrating a weld state monitoring method according to one or more embodiments following FIG. 17A.

On the other hand, if the welding is not the butt welding (NO) in step S3 (that is, if the welding is a corner joint), in FIG. 17B, the image analysis device 20 determines whether or not a welding defect of a narrow welding seam has occurred in step S12. If a welding defect of a narrow welding seam has occurred (YES), in step S13, the image analysis device 20 instructs the NC device 40 to display an error indicating that a welding defect of a narrow welding seam has occurred on the display 51, and shifts the process to step S14. If a welding defect of a narrow welding seam has not occurred (NO), the image analysis device 20 shifts the process to step S14.

In step S14, the image analysis device 20 determines whether or not a welding defect of a flat welding seam has occurred. If a welding defect of a flat welding seam has occurred (YES), in step S15, the image analysis device 20 instructs the NC device 40 to display an error indicating that a welding defect of a flat welding seam has occurred on the display 51, and shifts the process to step S16. If a welding defect of a flat welding seam has not occurred (NO), the image analysis device 20 shifts the process to step S16.

In step S16, the image analysis device 20 determines whether or not a welding defect of excessive melting has occurred in. If a welding defect of excessive melting has occurred (YES), in step S17, the image analysis device 20 instructs the NC device 40 to display an error indicating that a welding defect of excessive melting has occurred on the display 51, and shifts the process to step S18. If a welding defect of excessive melting has not occurred (NO), the image analysis device 20 shifts the process to step S18.

In step S18, the image analysis device 20 determines whether or not the welding has ended based on the information supplied from the NC device. If the welding has not ended (NO), the image analysis device 20 returns the process to step S3, and repeats the processing of steps S4 to S11 or steps S12 to S17, while the sheet metals W are being welded. If the welding has ended (YES), the image analysis device 20 terminates the monitoring process.

The order of determination of welding defects in steps S4 to S11 is an example, and the order is arbitrary. The order of determination of welding defects in steps S12 to S17 is an example, and the order is arbitrary. The image analysis device 20 may switch the welding defects in a predetermined order to be determined among welding defects of a plurality of determination targets during the welding of the sheet metals W1 and W2.

As described above, in accordance with the weld state monitoring method according to one or more embodiments, it is possible to determine in real time whether or not a welding defect has occurred during the welding of the sheet metals W. In accordance with the weld state monitoring method according to one or more embodiments, it is possible to determine which welding defect among a plurality of types of welding defects has occurred when a welding defect has occurred, and it is possible to inform the operator of the laser welding machine which welding defect has occurred.

The present invention is not limited to the above-described one or more embodiments, and various modifications can be made without departing from the scope of the invention. In one or more embodiments, the following are determination targets: an underfill, an unconnected welding defect, an insufficient penetration, and an edge displacement in the butt welding, as well as a narrow welding seam, a flat welding seam, and an excessive melting in the welding of a corner joint. One or more other welding defects can be determination targets. By setting one or a plurality of regions of interest according to the characteristics of the luminance in the analysis window 111 when each welding defect has occurred, it is possible to determine whether or not each welding defect has occurred.

The laser welding machine includes the camera 11 that captures a predetermined range including the beam spot BS in the first and second sheet metals (the sheet metals W1 and W2) in a state where the laser beam is irradiated to the first and second sheet metals. The laser welding machine includes the image analysis device 20 that determines whether or not a welding defect has occurred based on the image signal obtained by capturing the first and second sheet metals by the camera 11. The image analysis device 20 may have the following configuration.

The image analysis device 20 sets the analysis window 111 as a region for determining whether or not a welding defect has occurred in the frame 110 of the image signal. The center of the beam spot BS is located at the reference point (origin P0) set in the analysis window 111. The image analysis device 20 includes the region extractor 21 that extracts pixels of a region of interest whose position is set with reference to the reference point corresponding to a welding defect of a determination target, among pixels included in the analysis window 111. The image analysis device 20 includes the welding defect determination unit 22 that determines whether or not a welding defect as a determination target has occurred, based on the luminance in the region of interest extracted by the region extractor 21.

The entire contents of Patent Application No. 10 2018 220 329.6 filed in the Federal Republic of Germany on Nov. 27, 2018 are incorporated herein by reference.

REFERENCE SIGNS LIST

1: laser oscillator
2: delivery fiber
2e: end cap
3: collimating lens
4, 14: bend mirror
5, 16: focusing lens
10: welding head
11: camera
12: band pass filter
13: illumination device
15: driver
20: image analysis device
21: region extractor
22: welding defect determination unit
23: read controller
24: camera controller
25: image focusing lens controller
26: illumination device controller
30: database
40: NC device (control device)
51: display
52: operation unit
W, W1, W2: sheet metal

The invention claimed is:

1. A laser welding machine comprising:
a camera configured to capture a predetermined range including a beam spot of a laser beam irradiated on first and second sheet metals to be welded; and
an image analysis device configured to determine whether or not a welding defect has occurred, based on an image signal obtained by capturing the first and second sheet metals by the camera, wherein:
the image analysis device sets an analysis window as a region for determining whether or not a welding defect has occurred in each frame of the image signal, and
a center of the beam spot is located at a reference point set in the analysis window,
the image analysis device including:
a region extractor configured to extract pixels of a region of interest whose position in the analysis window is set with reference to the reference point corresponding to a welding defect of a determination target, among pixels included in the analysis window; and
a welding defect determination unit configured to determine whether or not the welding defect of the determination target has occurred, based on luminance in the region of interest extracted by the region extractor, and
wherein:
a first region of interest is set corresponding to a high luminance region generated so as to include the beam spot in a state where no welding defect has occurred,
second and third regions of interest are set in the first region of interest on a front and a rear side of the reference point in a scanning direction of the laser beam, respectively,
the region extractor extracts pixels in the second and third regions of interest,
the welding defect determination unit compares luminance in the second and third regions of interest with a first threshold, and determines whether or not an underfill has occurred in a butt welding of the first and second sheet metals, depending on whether or not at least a condition that the luminance in the second region of interest is lower than the first threshold and the luminance in the third region of interest is higher than the first threshold is satisfied.

2. A laser welding machine comprising:
a camera configured to capture a predetermined range including a beam spot of a laser beam irradiated on first and second sheet metals to be welded; and
an image analysis device configured to determine whether or not a welding defect has occurred, based on an image signal obtained by capturing the first and second sheet metals by the camera,
wherein
the image analysis device sets an analysis window as a region for determining whether or not a welding defect has occurred in each frame of the image signal, and
a center of the beam spot is located at a reference point set in the analysis window,
the image analysis device including;
a region extractor configured to extract pixels of a region of interest whose position in the analysis window is set with reference to the reference point corresponding to a welding defect of a determination target, among pixels included in the analysis window; and
a welding defect determination unit configured to determine whether or not the welding defect of the determination target has occurred, based on luminance in the region of interest extracted by the region extractor, and
wherein:
a first region of interest is set corresponding to a high luminance region generated so as to include the beam spot in a state where no welding defect has occurred,
second and third regions of interest are set in the first region of interest on a front and a rear side of the reference point in a scanning direction of the laser beam, respectively,
the region extractor extracts pixels in the second and third regions of interest,
the welding defect determination unit compares luminance in the second and third regions of interest with a second threshold, and determines whether or not an unconnected welding defect in which the first and second sheet metals are not connected has occurred in a butt welding of the first and second sheet metals, depending on whether or not at least a condition that the luminance in the second and third regions of interest is lower than the second threshold is satisfied.

3. A laser welding machine comprising:
a camera configured to capture a predetermined range including a beam spot of a laser beam irradiated on first and second sheet metals to be welded; and an image analysis device configured to determine whether or not a welding defect has occurred, based on an image signal obtained by capturing the first and second sheet metals by the camera, wherein:
the image analysis device sets an analysis window as a region for determining whether or not a welding defect has occurred in each frame of the image signal, and
a center of the beam spot is located at a reference point set in the analysis window,
the image analysis device including:
a region extractor configured to extract pixels of a region of interest whose position in the analysis window is set with reference to the reference point corresponding to a welding defect of a determination target, among pixels included in the analysis window; and
a welding defect determination unit configured to determine whether or not the welding defect of the determination target has occurred, based on luminance in the region of interest extracted by the region extractor, and wherein:
a first region of interest is set corresponding to a high luminance region generated so as to include the beam spot in a state where no welding defect has occurred,
the region extractor extracts pixels in the first region of interest,
the welding defect determination unit compares luminance in the first region of interest with a third threshold, and determines whether or not a welding defect of insufficient penetration in which a welding seam is formed only partway in a depth direction from surfaces of the first and second sheet metals in a butt welding of the first and second sheet metals, depending on whether or not at least a condition that the luminance in the first region of interest is lower than the third threshold is satisfied.

4. A laser welding machine comprising:
a camera configured to capture a predetermined range including a beam spot of a laser beam irradiated on first and second sheet metals to be welded; and
an image analysis device configured to determine whether or not a welding defect has occurred, based on an image signal obtained by capturing the first and second sheet metals by the camera, wherein:
the image analysis device sets an analysis window as a region for determining whether or not a welding defect has occurred in each frame of the image signal, and
a center of the beam spot is located at a reference point set in the analysis window,
the image analysis device including:
a region extractor configured to extract pixels of a region of interest whose position in the analysis window is set with reference to the reference point corresponding to a welding defect of a determination target, among pixels included in the analysis window; and
a welding defect determination unit configured to determine whether or not the welding defect of the determination target has occurred, based on luminance in the region of interest extracted by the region extractor, and wherein:
a first region of interest is set corresponding to a high luminance region generated so as to include the beam spot in a state where no welding defect has occurred,
fourth and fifth regions of interest are set outside the first region of interest on a rear side of the reference point in a scanning direction of the laser beam, so as to sandwich the first region of interest,
the region extractor extracts pixels in the fourth and fifth regions of interest,
the welding defect determination unit determines whether or not a welding defect of edge displacement in which the first and second sheet metals are welded in a state where end faces of the first and second sheet metals are displaced in a butt welding of the first and second sheet metals, depending on whether or not a difference between luminance in the fourth and fifth regions of interest is equal to or greater than the fourth threshold is satisfied.

5. A laser welding machine comprising:
a camera configured to capture a predetermined range including a beam spot of a laser beam irradiated on first and second sheet metals to be welded; and
an image analysis device configured to determine whether or not a welding defect has occurred, based on an image signal obtained by capturing the first and second sheet metals by the camera, wherein:
the image analysis device sets an analysis window as a region for determining whether or not a welding defect has occurred in each frame of the image signal, and
a center of the beam spot is located at a reference point set in the analysis window,
the image analysis device including:
a region extractor configured to extract pixels of a region of interest whose position in the analysis window is set with reference to the reference point corresponding to a welding defect of a determination target, among pixels included in the analysis window; and
a welding defect determination unit configured to determine whether or not the welding defect of the determination target has occurred, based on luminance in the region of interest extracted by the region extractor, and wherein:
a first region of interest is set corresponding to a high luminance region generated so as to include the beam spot in a state where no welding defect has occurred,
sixth and seventh regions of interest are set in the first region of interest on a rear side of the reference point in a scanning direction of the laser beam, which are separated from each other in the direction orthogonal to the scanning direction,
the region extractor extracts pixels in the sixth and seventh regions of interest,
the welding defect determination unit determines whether or not a welding defect of a narrow welding seam in which a width of a welding seam is narrow in a welding of a corner joint of the first and second sheet metals, depending on whether or not a difference between luminance in the sixth and seventh regions of interest is equal to or greater than a fifth threshold is satisfied.

6. A laser welding machine comprising:
a camera configured to capture a predetermined range including a beam spot of a laser beam irradiated on first and second sheet metals to be welded; and
an image analysis device configured to determine whether or not a welding defect has occurred, based on an image signal obtained by capturing the first and second sheet metals by the camera,
wherein:
   the image analysis device sets an analysis window as a region for determining whether or not a welding defect has occurred in each frame of the image signal, and
   a center of the beam spot is located at a reference point set in the analysis window,
the image analysis device including;
   a region extractor configured to extract pixels of a region of interest whose position in the analysis window is set with reference to the reference point corresponding to a welding defect of a determination target, among pixels included in the analysis window; and
   a welding defect determination unit configured to determine whether or not the welding defect of the determination target has occurred, based on luminance in the region of interest extracted by the region extractor, and
wherein:
   a first region of interest is set corresponding to a high luminance region generated so as to include the beam spot in a state where no welding defect has occurred,
   eighth and ninth regions of interest are set outside the first region of interest on a rear side of the reference point in a scanning direction of the laser beam, which are separated from each other in the direction orthogonal to the scanning direction,
   the region extractor extracts pixels in the eighth and ninth regions of interest,
   the welding defect determination unit determines whether or not a welding defect of a flat welding seam in which a welding seam is flat in a welding of a corner joint of the first and second sheet metals, depending on whether or not luminance in the eighth and ninth regions of interest is lower than a sixth threshold is satisfied.

7. A laser welding machine comprising:
a camera configured to capture a predetermined range including a beam spot of a laser beam irradiated on first and second sheet metals to be welded; and
an image analysis device configured to determine whether or not a welding defect has occurred, based on an image signal obtained by capturing the first and second sheet metals by the camera,
wherein:
   the image analysis device sets an analysis window as a region for determining whether or not a welding defect has occurred in each frame of the image signal, and
   a center of the beam spot is located at a reference point set in the analysis window,
the image analysis device including:
   a region extractor configured to extract pixels of a region of interest whose position in the analysis window is set with reference to the reference point corresponding to a welding defect of a determination target, among pixels included in the analysis window; and
   a welding defect determination unit configured to determine whether or not the welding defect of the determination target has occurred, based on luminance in the region of interest extracted by the region extractor, and
wherein:
   a first region of interest is set corresponding to a high luminance region generated so as to include the beam spot in a state where no welding defect has occurred,
   a tenth region of interest is set outside the first region of interest on a rear side of the reference point in a scanning direction of the laser beam, so as to straddle a boundary between the first and second sheet metals,
   the region extractor extracts pixels in the tenth region of interest,
   the welding defect determination unit determines whether or not a welding defect of excessive melting in a welding of a corner joint of the first and second sheet metals, depending on whether or not luminance in the tenth region of interest is higher than a seventh threshold is satisfied.

* * * * *